United States Patent
Eapen et al.

(10) Patent No.: US 11,977,884 B2
(45) Date of Patent: May 7, 2024

(54) REPLICATE ELEMENTS INSTRUCTION

(71) Applicant: ARM LIMITED, Cambridge (GB)

(72) Inventors: Jacob Eapen, Cambridge (GB); Grigorios Magklis, Cambridge (GB); Mbou Eyole, Cambridge (GB)

(73) Assignee: Arm Limited, Cambridge (GB)

( * ) Notice: Subject to any disclaimer, the term of this patent is extended or adjusted under 35 U.S.C. 154(b) by 79 days.

(21) Appl. No.: 16/468,108

(22) PCT Filed: Nov. 10, 2017

(86) PCT No.: PCT/GB2017/053395
§ 371 (c)(1),
(2) Date: Jun. 10, 2019

(87) PCT Pub. No.: WO2018/109428
PCT Pub. Date: Jun. 21, 2018

(65) Prior Publication Data
US 2019/0303155 A1    Oct. 3, 2019

(30) Foreign Application Priority Data

Dec. 13, 2016 (EP) ..................... 16386020

(51) Int. Cl.
*G06F 9/315* (2018.01)
*G06F 9/30* (2018.01)

(52) U.S. Cl.
CPC ...... *G06F 9/30032* (2013.01); *G06F 9/30018* (2013.01); *G06F 9/30036* (2013.01); *G06F 9/30109* (2013.01)

(58) Field of Classification Search
CPC ............ G06F 9/30032; G06F 9/30036; G06F 9/30018; G06F 9/30109; G06F 9/30038
See application file for complete search history.

(56) References Cited

U.S. PATENT DOCUMENTS 5,822,786 A    10/1998  Widigen et al.
7,155,601 B2 *  12/2006  Chennupaty ........ G06F 9/30025
                                                            712/300
(Continued)

FOREIGN PATENT DOCUMENTS

CA    2758366    5/2012
CN    1478234    2/2004
(Continued)

OTHER PUBLICATIONS

Rahman, "Intel Xeon Phi Coprocessor Architecture and Tools—The Guide for Application Developers; Chapter 3: Xeon Phi Vector Architecture and Instruction Set", 2013, pp. 31-47.*

(Continued)

*Primary Examiner* — David J. Huisman
(74) *Attorney, Agent, or Firm* — NIXON & VANDERHYE P.C.

(57) ABSTRACT

A replicate elements instruction defining a plurality of variable length segments in a result vector controls processing circuitry (80) to generate a result vector in which, in each respective segment, a repeating value is repeated throughout that segment of the result vector, the repeating value comprising a data value or element index of a selected data element of a source vector. This instructions is useful for accelerating processing of data structures smaller than the vector length.

16 Claims, 14 Drawing Sheets

(56) References Cited

U.S. PATENT DOCUMENTS

| | | |
|---|---|---|
| 7,685,109 B1 | 3/2010 | Ransil et al. |
| 7,853,778 B2 | 12/2010 | Roussel |
| 8,225,075 B2 | 7/2012 | Macy, Jr. et al. |
| 9,342,479 B2 | 5/2016 | Fridman et al. |
| 9,575,753 B2 | 2/2017 | Eichenberger |
| 10,423,413 B2 | 9/2019 | Anderson |
| 10,445,092 B2 * | 10/2019 | San Adrian ......... G06F 15/8084 |
| 2002/0112147 A1 | 8/2002 | Chennupaty et al. |
| 2004/0054877 A1 | 3/2004 | Macy, Jr. et al. |
| 2004/0054878 A1 * | 3/2004 | Debes .................. G06F 17/147 712/221 |
| 2004/0068642 A1 | 4/2004 | Tanaka |
| 2004/0133617 A1 | 7/2004 | Chen |
| 2004/0133766 A1 | 7/2004 | Abraham et al. |
| 2007/0106882 A1 | 5/2007 | Thornton |
| 2008/0154928 A1 | 6/2008 | Bashyam et al. |
| 2010/0077180 A1 * | 3/2010 | Gonion ................ G06F 9/3842 712/205 |
| 2010/0211946 A1 | 8/2010 | Elzur |
| 2012/0131312 A1 | 5/2012 | Seal et al. |
| 2013/0305020 A1 * | 11/2013 | Valentine ............ G06F 9/30036 712/208 |
| 2013/0339664 A1 * | 12/2013 | Ould-Ahmed-Vall ...................... G06F 9/30109 712/205 |
| 2014/0019714 A1 * | 1/2014 | Ould-Ahmed-Vall ...................... G06F 9/30018 712/4 |
| 2014/0059322 A1 | 2/2014 | Ould-Ahmed-Vall |
| 2014/0059323 A1 | 2/2014 | Fridman et al. |
| 2014/0122831 A1 | 5/2014 | Uliel et al. |
| 2014/0189323 A1 * | 7/2014 | Bharadwaj .......... G06F 9/30098 712/224 |
| 2015/0019838 A1 | 1/2015 | Anderson et al. |
| 2016/0179521 A1 | 6/2016 | Jha et al. |
| 2016/0224511 A1 | 8/2016 | Moudgill et al. |
| 2017/0177350 A1 | 6/2017 | Ould-Ahmed-Vall |
| 2018/0189184 A1 * | 7/2018 | Zbiciak ............... G06F 9/30047 |
| 2019/0004801 A1 | 1/2019 | Haber |

FOREIGN PATENT DOCUMENTS

| | | |
|---|---|---|
| CN | 101556544 | 10/2009 |
| CN | 102197369 | 9/2011 |
| CN | 102884512 | 1/2013 |
| CN | 102906699 | 1/2013 |
| CN | 103457718 | 12/2013 |
| CN | 104054073 | 9/2014 |
| CN | 104487941 | 4/2015 |
| CN | 104969179 | 10/2015 |
| CN | 105094749 | 11/2015 |
| CN | 105229599 | 1/2016 |
| CN | 105960630 | 9/2016 |
| CN | 106030514 | 10/2016 |
| EP | 0 743 592 | 11/1996 |
| JP | 8-314717 | 11/1996 |
| JP | 2005-508043 | 3/2005 |
| JP | 2006-502464 | 1/2006 |
| JP | 2015-158940 | 9/2015 |
| KR | 10-2006-0040611 | 5/2006 |
| KR | 10-2013-0137700 | 12/2013 |
| KR | 10-2016-0113704 | 9/2016 |
| TW | I516937 B | 1/2016 |
| WO | 2015/145193 | 10/2015 |
| WO | WO-2015145193 A1 * | 10/2015 ......... G06F 9/30032 |

OTHER PUBLICATIONS

International Search Report and Written Opinion of the International Searching Authority for PCT/GB2017/053395 dated Feb. 14, 2018, 12 pages.

U.S. Appl. No. 16/468,098, filed Jun. 10, 2019, Eapen et al.

International Search Report and Written Opinion of the ISA for PCT/GB2017/053397, dated Feb. 9, 2018, 12 pages.

Office Action dated Nov. 13, 2020 for U.S. Appl. No. 16/468,098, 17 pages.

Freescale Semiconductor, "AltiVec Technology Programming Interface Manual", 1999, 15 pages.

Intel, "Intel C++ Compiler XE 13.0 User and Reference Guides, Document No. 323273-130US; mm512_extload_epi32/_mm512_mask_extload_epi32", 2 pages.

Office Action for KR Application No. 10-2019-7018951 dated Jan. 20, 2022 and English translation, 10 pages.

Office Action for TW Application No. 106142855 dated Aug. 20, 2021 and English translation, 24 pages.

Office Action for JP Application No. 2019-530162 dated Oct. 15, 2021 and English translation, 5 pages.

Office Action for TW Application No. 106142869 dated Sep. 2, 2021 and English translation, 22 pages.

Office Action for JP Application No. 2019-530214 dated Oct. 15, 2021 and English translation, 8 pages.

Final Office Action dated Apr. 15, 2021 for U.S. Appl. No. 16/468,098, 17 pages.

Office Action for KR Application No. 10-2019-7018952 dated Dec. 20, 2021 and English translation, 11 pages.

Office Action dated Jun. 2, 2022 for U.S. Appl. No. 16/468,098, 19 pages.

Office Action for CN Application No. 201780076939.8 dated Nov. 25, 2022 and English translation, 15 pages.

Final Office Action dated Nov. 14, 2022 for U.S. Appl. No. 16/468,098, 16 gages.

Office Action for CN Application No. 201780076956.1 dated Nov. 24, 2022 and English translation, 15 pages.

Notice of Allowance for CN Application No. 201780076939.8 dated Jun. 15, 2023 and English translation, 9 pages.

Notice of Allowance for CN Application No. 201780076956.1 dated Jun. 15, 2023 and English translation, 9 pages.

* cited by examiner

*REP_ELEMENTS Zd, Pg, Zs, Ps*

| | p2 | | | | p1 | p0 | | |
|---|---|---|---|---|---|---|---|---|
| 0 | 1 | 0 | 0 | 0 | 1 | 1 | 0 | Pg |
| 0 | 1 | 1 | 1 | 0 | 1 | 1 | 1 | Ps |
| h | g | f | (e) | d | (c) | b | (a) | Zs |
| inactive | seg 2 | | | | seg 1 | seg 0 | | |
| 0 | e | e | e | e | c | a | a | Zd |
| 7 | 6 | 5 | 4 | 3 | 2 | 1 | 0 | |

FIG. 12

| | | | p0 | | | | | |
|---|---|---|---|---|---|---|---|---|
| 0 | 0 | 0 | 1 | 0 | 0 | 0 | 0 | Pg |
| 0 | 1 | 0 | 0 | 1 | 0 | 0 | 0 | Ps |
| h | g | f | e | d | c | b | a | Zs |
| 0 | 0 | 0 | d | d | d | d | d | Zd(Zeroing) |
| z | y | x | d | d | d | d | d | Zd(Merging) |

FIG. 13

| | | p0 | | | | | | |
|---|---|---|---|---|---|---|---|---|
| 1 | 0 | 0 | 0 | 0 | 0 | 0 | 0 | Pg |
| 0 | 0 | 0 | 1 | 0 | 0 | 0 | 0 | Ps |
| h | g | f | e | d | c | b | a | Zs |
| e | e | e | e | e | e | e | e | Zd |

FIG. 14

|    | p1 |    |   | p0 |    |    |    |    |     |
|----|----|----|---|----|----|----|----|----|-----|
| 0  | 0  | 0  | 1 | 0  | 0  | 0  | 0  | Pg |
| 0  | 0  | 1  | 1 | 0  | 0  | 0  | 0  | Ps |
| h  | g  | f  | e | d  | c  | b  | a  | Zs |
| f  | f  | f  | e | e  | e  | e  | e  | Zd |
| 7  | 6  | 5  | 4 | 3  | 2  | 1  | 0  |    |

FIG. 15

|   |   |   | p0 |   |   |   |   |    |
|---|---|---|----|---|---|---|---|----|
| 0 | 0 | 0 | 0  | 0 | 0 | 0 | 0 | Pg |
| 0 | 0 | 0 | 1  | 0 | 0 | 0 | 0 | Ps |
| h | g | f | e  | d | c | b | a | Zs |
| e | e | e | e  | e | e | e | e | Zd |

FIG. 16

| y0  | y1  | x0  | x1  | x2  | x3  |
|-----|-----|-----|-----|-----|-----|
| y2  | y3  | x4  | x5  | x6  | x7  |
| z0  | z1  | x8  | x9  | x10 | x11 |
| z2  | z3  | x12 | x13 | x14 | x15 |

Frame A

×

| b0 | b1 | a0  | a1  | a2  | a3  |
|----|----|-----|-----|-----|-----|
| b2 | b3 | a4  | a5  | a6  | a7  |
| c0 | c1 | a8  | a9  | a10 | a11 |
| c2 | c3 | a12 | a13 | a14 | a15 |

Frame B

=

| t0 | t1 | u0  | u1  | u2  | u3  |
|----|----|-----|-----|-----|-----|
| t2 | t3 | u4  | u5  | u6  | u7  |
| w0 | w1 | u8  | u9  | u10 | u11 |
| w2 | w3 | u12 | u13 | u14 | u15 |

Output (Resultant Frame)

Iteration 1

| Frame-A |

Continuous Load Operation

| v0 | y0 | y1 | x0 | x1 | x2 | x3 |
|----|----|----|----|----|----|----|

Replicate Element Operations

| p0 | 0 | 1 | 0 | 0 | 0 | 1 |
|----|---|---|---|---|---|---|

| v1 | y0 | y0 | x0 | x0 | x0 | x0 |
|----|----|----|----|----|----|----|
| v2 | y1 | y1 | x1 | x1 | x1 | x1 |
| v3 | 0  | 0  | x2 | x2 | x2 | x2 |
| v4 | 0  | 0  | x3 | x3 | x3 | x3 |

| Frame-B |

Continuous Load Operation

| p1 | 0 | 0 | 1 | 1 | 1 | 1 |
|----|---|---|---|---|---|---|

| v5    | b0 | b1 | a0  | a1  | a2  | a3  |
|-------|----|----|-----|-----|-----|-----|
| v6    | b2 | b3 | a4  | a5  | a6  | a7  |
| v7(p1)| 0  | 0  | a8  | a9  | a10 | a11 |
| v8(p1)| 0  | 0  | a12 | a13 | a14 | a15 |

Operations

| v1·v5 | y0·b0 | y0·b1 | x0·a0  | x0·a1  | x0·a2  | x0·a3  |
|-------|-------|-------|--------|--------|--------|--------|
| v2·v6 | y1·b2 | y1·b3 | x1·a4  | x1·a5  | x1·a6  | x1·a7  |
| v3·v7 | 0     | 0     | x2·a8  | x2·a9  | x2·a10 | x2·a11 |
| v4·v8 | 0     | 0     | x3·a12 | x3·a13 | x3·a14 | x3·a15 |

Accumulation of above values generate first row or resultant frame

| v9 | t0 | t1 | u0 | u1 | u2 | u3 |
|----|----|----|----|----|----|----|

FIG. 20

Iteration 2

Frame-A

Continuous Load Operation

| | | | | | |
|---|---|---|---|---|---|
| v0 | y2 | y3 | x4 | x5 | x6 | x7 |

Replicate Element Operations

| | | | | | |
|---|---|---|---|---|---|
| p0 | 0 | 1 | 0 | 0 | 0 | 1 |

| v1 | y2 | y2 | x4 | x4 | x4 | x4 |
| v2 | y3 | y3 | x5 | x5 | x5 | x5 |
| v3 | 0 | 0 | x6 | x6 | x6 | x6 |
| v4 | 0 | 0 | x7 | x7 | x7 | x7 |

Frame-B

Continuous Load Operation

| p1 | 0 | 0 | 1 | 1 | 1 | 1 |
|---|---|---|---|---|---|---|
| v5 | b0 | b1 | a0 | a1 | a2 | a3 |
| v6 | b2 | b3 | a4 | a5 | a6 | a7 |
| v7(p1) | 0 | 0 | a8 | a9 | a10 | a11 |
| v8(p1) | 0 | 0 | a12 | a13 | a14 | a15 |

Operations

| v1·v5 | y2·b0 | y2·b1 | x4·a0 | x4·a1 | x4·a2 | x4·a3 |
| v2·v6 | y3·b2 | y3·b3 | x5·a4 | x5·a5 | x5·a6 | x5·a7 |
| v3·v7 | 0 | 0 | x6·a8 | x6·a9 | x6·a10 | x6·a11 |
| v4·v8 | 0 | 0 | x7·a12 | x7·a13 | x7·a14 | x7·a15 |

Accumulation of above values generate first row or resultant frame

| v9 | t2 | t3 | u4 | u5 | u6 | u7 |

Iteration 3

Frame-A

Continuous Load Operation

| v0 | z0 | z1 | x8 | x9 | x10 | x11 |
|---|---|---|---|---|---|---|

Replicate Element Operations

| p0 | 0 | 1 | 0 | 0 | 0 | 1 |
|---|---|---|---|---|---|---|
| v1 | 0 | 0 | x8 | x8 | x8 | x8 |
| v2 | 0 | 0 | x9 | x9 | x9 | x9 |
| v3 | z0 | z0 | x10 | x10 | x10 | x10 |
| v4 | z1 | z1 | x11 | x11 | x11 | x11 |

Frame-B

Continuous Load Operation

| p1 | 0 | 0 | 1 | 1 | 1 | 1 |
|---|---|---|---|---|---|---|
| v5(p1) | 0 | 0 | a0 | a1 | a2 | a3 |
| v6(p1) | 0 | 0 | a4 | a5 | a6 | a7 |
| v7 | c0 | c1 | a8 | a9 | a10 | a11 |
| v8 | c2 | c3 | a12 | a13 | a14 | a15 |

Operations

| v1·v5 | 0 | 0 | x8·a0 | x8·a1 | x8·a2 | x8·a3 |
| v2·v6 | 0 | 0 | x9·a4 | x9·a5 | x9·a6 | x9·a7 |
| v3·v7 | z0·c0 | z0·c1 | x10·a8 | x10·a9 | x10·a10 | x10·a11 |
| v4·v8 | z1·c2 | z1·c3 | x11·a12 | x11·a13 | x11·a14 | x11·a15 |

Accumulation of above values generate first row or resultant frame

| v9 | w0 | w1 | u8 | u9 | u10 | u11 |

FIG. 21

Iteration 4

Frame-A

Continuous Load Operations

| v0 | z2 | z3 | x12 | x13 | x14 | x15 |

Replicate Element Operations

| p1 | 0 | 1 | 0 | 0 | 0 | 1 |

| v1 | 0 | 0 | x12 | x12 | x12 | x12 |
| v2 | 0 | 0 | x13 | x13 | x13 | x13 |
| v3 | z2 | z2 | x14 | x14 | x14 | x14 |
| v4 | z3 | z3 | x15 | x15 | x15 | x15 |

Frame-B

Continuous Load Operations

| p0 | 0 | 0 | 1 | 1 | 1 | 1 |

| v5(p1) | 0 | 0 | a0 | a1 | a2 | a3 |
| v6(p1) | 0 | 0 | a4 | a5 | a6 | a7 |
| v7 | c0 | c1 | a8 | a9 | a10 | a11 |
| v8 | c2 | c3 | a12 | a13 | a14 | a15 |

Operations

| v1·v5 | 0 | 0 | x12·a0 | x12·a1 | x12·a2 | x12·a3 |
| v2·v6 | 0 | 0 | x13·a4 | x13·a5 | x13·a6 | x13·a7 |
| v3·v7 | z2·c0 | z2·c1 | x14·a8 | x14·a9 | x14·a10 | x14·a11 |
| v4·v8 | z3·c2 | z3·c3 | x15·a12 | x15·a13 | x15·a14 | x15·a15 |

Accumulation of above values generate first row or resultant frame

| v9 | w2 | w3 | u12 | u13 | u14 | u15 |

FIG. 22

REPLICATE ELEMENTS INSTRUCTION

This application is the U.S. national phase of International Application No. PCT/GB2017/053395 filed Nov. 10, 2017 which designated the U.S. and claims priority to EP Application No. 16386020.8 filed Dec. 13, 2016, the entire contents of each of which are hereby incorporated by reference.

The present technique relates to the field of data processing. More particularly, it relates to the processing of vector instructions.

Some data processing systems support processing of vector instructions for which a source operand or result value of the instruction is a vector comprising multiple data elements. By supporting the processing of a number of distinct data elements in response to a single instruction, code density can be improved and the overhead of fetching and decoding of instructions reduced. An array of data values to be processed can be processed more efficiently by loading the data values into respective elements of a vector operand and processing the data values several elements at a time using a single vector instruction.

At least some examples provide an apparatus comprising:
processing circuitry to perform vector processing operations on vectors comprising a plurality of data elements; and
an instruction decoder to decode program instructions to control the processing circuitry to perform the vector processing operations;
wherein in response to a replicate elements instruction specifying segment information defining positions of a plurality of variable size segments within a result vector, each segment comprising at least one data element of the result vector and at least one segment comprising a plurality of adjacent elements of the result vector, the instruction decoder is configured to control the processing circuitry to generate a result vector in which, in each respective segment, a repeating value is repeated throughout that segment of the result vector, the repeating value comprising a data value at a selected data element position of the corresponding segment of a source vector or an element index indicating said selected data element position.

At least some examples provide a data processing method for an apparatus comprising processing circuitry to perform vector processing operations on vectors comprising a plurality of data elements; the method comprising:
decoding a replicate elements instruction specifying segment information defining positions of a plurality of variable size segments within a result vector, each segment comprising at least one data element of the result vector and at least one segment comprising a plurality of adjacent elements of the result vector; and
in response to the replicate elements instruction, generating a result vector in which, in each respective segment, a repeating value is repeated throughout that segment of the result vector, the repeating value comprising a data value at a selected data element position of the corresponding segment of a source vector or an element index indicating said selected data element position.

At least some examples provide a computer-readable storage medium storing a virtual machine program for controlling a computer to provide an instruction execution environment corresponding to the apparatus described above.

Further aspects, features and advantages of the present technique will be apparent from the following description of examples, which is to be read in conjunction with the accompanying drawings, in which:

FIG. 1 schematically illustrates an example of a data processing apparatus supporting processing of vector instructions;

FIGS. 12 to 16 illustrate an example of a source-transforming form of a replicate elements instruction;

FIGS. 20 to 22 shows an example of using the replicate element instruction for performing matrix multiplication on different size tiles in a frame.

Figure 1:
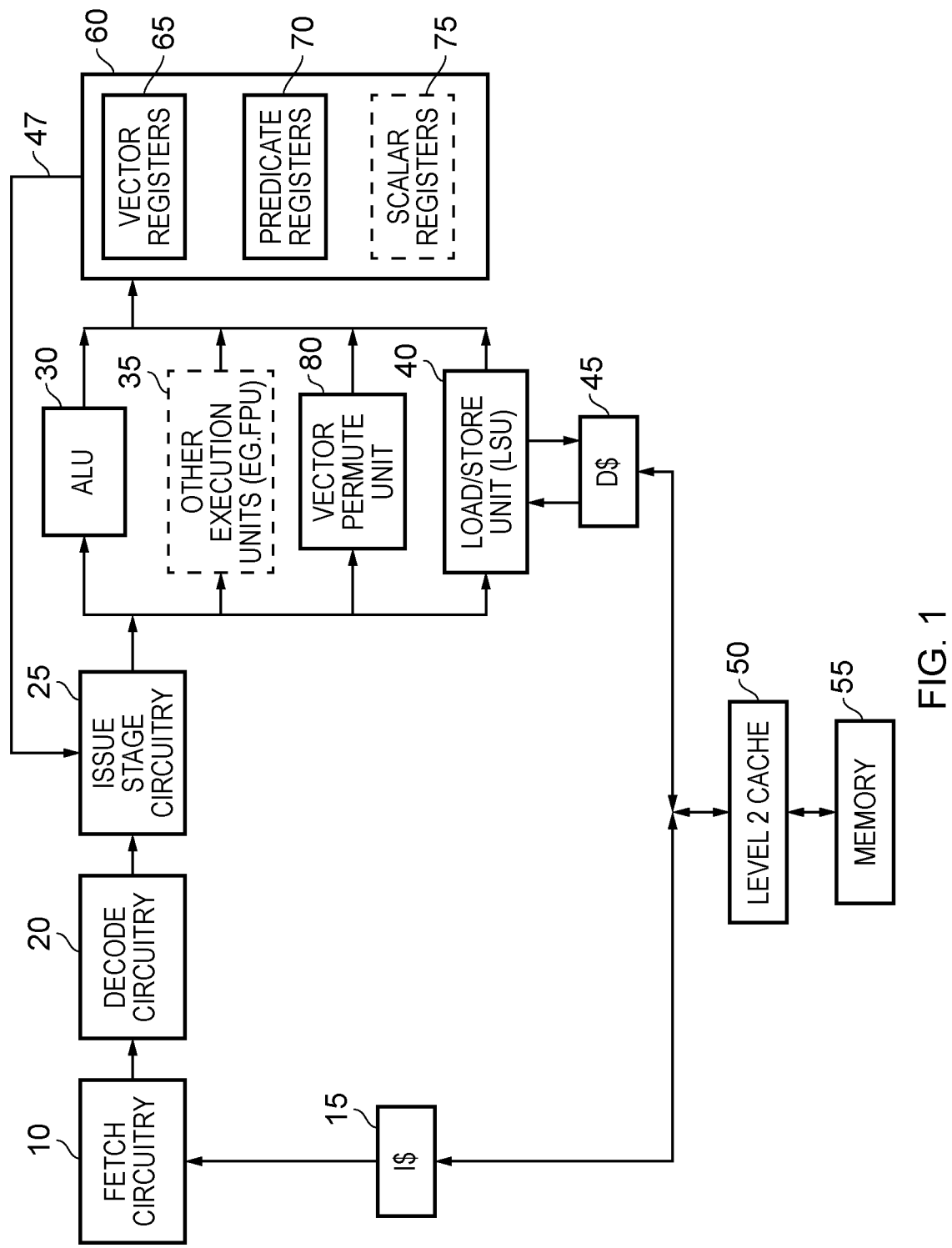

Some specific examples will be described below. It will be appreciated that the present technique is not limited to these exact examples.

A data processing apparatus may have processing circuitry to perform vector processing operations on vectors comprising a plurality of data elements, and an instruction decoder to decode program instructions to control the processing circuitry to perform the vector processing operations. For many processing applications, vector processing can improve performance by a factor depending on the vector length (the number of data elements in one vector). However, the inventors recognised that there are some algorithms, for example in digital signal processing (DSP), high performance computing (HPC) and networking applications, for which the dimensions of the data being processed can limit performance, so that increasing the vector length does not result in a corresponding performance speed up. An example of such an algorithm may be one that involves matrix multiplication of matrices with relatively small dimensions (e.g. 2×2, 3×3, 4×4, 3×2, etc.). Applying standard vector instructions to such an algorithm can lead to inefficient performance, as many lanes of the vector may remain unfilled due to the small data dimension being operated on.

Replicate Partition Instruction

The instruction decoder may support a replicate partition instruction specifying partition information defining positions of two or more variable size partitions within a result vector. In response to the replicate partition instruction, the instruction decoder controls the processing circuitry to generate the result vector in which each partition having more than one data element comprises data values of a sequence of adjacent data elements of a source vector starting or ending at a selected data element position or an incrementing sequence of element indices starting or ending with the element index indicating said selected data element position.

Hence, the instruction can populate respective partitions of a result vector with data values of a sequence of data elements starting at a selected data element position in a source vector, or the corresponding element indices for the sequence of elements, where the positions of the partitions are variable and specified by the instruction. This instruction can help speed up vectorised processing of algorithms where the data structure has a dimension which is relatively small compared to the vector length. For example, this can allow each partition to be filled with the data values or element indices of a corresponding row or column of the data structure, with several instances of a given row or column packed within the same vector.

There are a number of options for encoding the partition information which defines the positions of the partitions. In one example, the partition information comprises partition mask information (which could be specified by reference to a register, or as an immediate value), including one or more marker bits each identifying the start or end of a partition within the result vector. Hence, by encoding the partition mask information with the marker bits in different locations within the mask, different numbers, positions and sizes of partitions can be defined. This can be useful for supporting processing of data structures with non-uniform row or column length.

Alternatively, the partition information could comprise partition size information indicating a number of data elements per partition. For example, the partition size information can be a scalar value indicating the number of data elements. In some examples, the partition size information could specify the number of data elements separately for each partition, e.g. by specifying an array of scalar values indicating the number of elements in each partition. However, if partitions of different sizes are required then it may be more efficient to encode this using the mask as in the example above.

In other examples, the encoding of the replicate partition instruction may constrain all partitions other than a first or last partition to have the same number of data elements. For example, the replicate partition instruction may specify a single scalar value specifying the desired size of each partition. The scalar value defining the partition size information could be specified as an immediate value or by reference to a register. Alternatively, the replicate partition instruction may specify a control mask where the partition size can be identified by the position of a first or last active bit relative to a fixed reference point, or by the number of data elements between the first and last active bits of the mask. With an encoding which specifies a single partition size for each partition, if the length of the active region of the vector in which the partitions are to be defined is an exact multiple of the partition size, then all the partitions may have the same size. However, if the number of data elements in the active region is not an exact multiple of the partition size then the first or last partition can be truncated so that it has fewer elements than the other partitions (the size of the first or last partition does not need to be encoded explicitly in the instruction as it can be implicit from the partition size and the vector length or the size of the active region). An instruction which constrains each partition (other than the first or last partition) to have the same number of data elements may require less encoding space in the instruction set architecture and can be enough to support many common processing algorithms using data structures where all the rows or columns have the same length (e.g. matrix multiplication of square or rectangular matrices).

For some examples of the replicate element instruction, the encoding of the instruction may include information for identifying different data element positions as the selected data element position for each partition. For example, the instruction could specify a stride parameter which identifies a common stride difference between the selected data element position for a given partition and the selected data element position for the next partition.

However, for other examples the selected data element position may be the same for each partition. Hence, effectively the replicate partition instruction may result in a given sequence of data values or element indices being repeated several times within the result vector (note that some repetitions may be truncated relative to other repetitions if the partition information defines partitions of different sizes within the same result vector). The ability to repeat a given sequence of data values or element indices multiple times within the result vector can be very useful for processing of matrices or similar data structures. For example, in a matrix multiplication the same row of the matrix may need to be multiplied with values in a number of different columns, so by replicating a given row of the matrix multiple times within the result vector, multiple iterations of combining the row with the respective columns can be handled in a single iteration of a vectorised loop of instructions.

In some examples, the replicate partition instruction may support cases where each partition is filled with the source vector data values or element indices corresponding a sequence of non-adjacent data elements of the vector. For example, a variant of the replicate partition instruction can pick out elements at intervals defined by a stride parameter (e.g. a sequence of elements 0, 2, 4, 6 . . . with stride 2 or elements 0, 3, 6 . . . with stride 3, say).

However, in other examples the sequence allocated to each partition may be a sequence of adjacent elements of the source vector or an incrementing sequence of element indices corresponding to those adjacent elements. Restricting each partition to being filled with the data values or element indices of a contiguous block of elements can simplify the instruction encoding and the hardware for executing the instruction, and can be enough to support commonly performed arithmetic operations, such as matrix arithmetic where it may be desirable to extract elements corresponding to a row of the matrix and repeat it a number of times for example.

In some examples, the selected data element position may be specified by default to be at a particular position within the source vector, without any information identifying the selected data element position being defined in the encoding of the replicate partition instruction. For example, by default the selected data element position could be the least significant data element (in examples where the selected data element position marks the start of the sequence of data elements for which the data values or element indices are to be allocated to each partition). Many vector processing algorithms may typically fill up vectors starting at the least significant element, so such an instruction may still support most use cases and require less encoding space than an instruction supporting sequences which start at an arbitrary location within the source vector. Similarly, for examples where the selected data element position marks the end of the sequence of data elements the selected data element position could be the most significant data element position.

However, in other examples, the selected data element position may be variable and specified by element selection information encoded within the replicate partition instruction. The partition position information could be encoded in different ways, e.g. through a mask value with the selected data element position identified by the position of the first or last active bit in the mask, or by a scalar value specifying the selected data element position. By allowing the replicate partition instruction to extract a sequence of data elements from a source vector (or output the corresponding element indices) corresponding to an arbitrary position within the source vector, this can reduce the need for other instructions to manipulate the source vector beforehand to place the desired data in the required location within the vector, to help reduce the total number of instructions needed to calculate a given processing result.

With some examples of the replicate partition instruction (e.g. when the partition information is defined using a mask with marker bits identifying the start/end of each partition), the instruction may support an encoding where at least one partition comprises a single element. When a partition comprising a single element is defined, that element may be populated with the data value or element index corresponding to the selected data element position within the source vector.

In some examples, the partition information may define partitions within the entire result vector, i.e. the entire vector may be considered to be an active portion.

However, in other examples the replicate partition instruction may specify active portion information defining an active portion of the result vector comprising the partitions. For such an instruction, the elements within the active portion are filled with data values or element indices corresponding to sequences of data elements as discussed above, but elements outside the active portion may take a different value. For example, the elements outside the active portion may be set to a predetermined value such as zero, or may retain the previous value of corresponding data elements of the destination register used to store the result vector. The active portion information can be encoded in different ways, e.g. using a mask (or predicate) value comprising a series of active bits marking the elements within the active portion. Alternatively, the active portion could be defined using a control mask with an active bit marking the end of the active portion, or by using a scalar value specifying the size of the active portion, with the active portion assumed by default to start at the least significant end of the vector.

In some cases, a common control value may have a combined encoding which specifies two or more of the partition information (defining the locations of the partitions within the result vector), element selection information (defining the start/end of the sequences to be allocated to each partition) and active region information (defining the elements of the result vector in which the partitions are to be formed). For example, the active portion information and the partition information can be encoded using a common bit mask, in which each bit corresponds to a given data element of the result vector and can be set to an active value (one of 1 and 0) or an inactive value (the other of 1 and 0). The position of the least significant active bit in the bit mask indicates the size of each partition, and the position of the most significant active bit in the bit mask indicates the size of the active portion. The selected data element position may be assumed implicitly to be the least significant data element position of the source vector, and the start of the active portion may also implicitly start at the least significant data element position. The partition size also implicitly identifies the positions of the partitions within the result vector, defining a repeating pattern of partitions where partitions of the specified size are repeated until the end of the active region is reached (with the final repetition being truncated if necessary). This type of instruction allows for a relatively efficient encoding of the control parameters of the replicate partition instruction in a single control mask, while supporting many common use cases, to avoid needing to consume additional control registers.

The replicate partition instruction may be implemented in different ways in hardware. In some cases, a general permute unit for mapping arbitrary positioned data elements of a source vector to arbitrary positions within the result vector may already be provided, in which case it can be reused for implementing the replicate partition instruction. However, as the set of source-to-result mappings required for the replicate partition instruction may be a restricted subset of the mappings supported by a general permute unit, in other examples some bespoke hardware which only supports the mappings required by the replicate partition instruction could be provided, which can be more efficient as it may allow some datalines linking a given element of the source vector to a given element of the result vector to be omitted if such an element mapping will never be required by the replicate partition instruction. Hence, it will be appreciated that the processing circuitry may process the replicate partition instruction using any circuitry which provides the result vector of the form discussed above.

A number of different forms of the replicate partition instruction can be provided. In response to a source-transforming form of the replicate partition instruction specifying a source register storing the source vector, the instruction decoder may control the processing circuitry to generate the result vector in which each partition having more than one data element comprises the data values of a sequence of data elements of the source vector starting or ending at the selected data element position. Hence, this form of the instruction extracts the required sequence of data values from the source vector and maps those data values to relevant partitions within the result vector.

Alternatively, the replicate partition operation can be combined with a load operation in a single instruction. In this case, rather than being stored in a register, the source vector may correspond to a set of data elements stored in a data store such as memory. In response to a load-replicate form of the replicate partition instruction, the instruction decoder may control the processing circuitry to load at least part of the source vector from a data store, and to generate the result vector in which the repeating pattern comprises the data values of the sequence of data elements from the source vector. This can give an equivalent result to the source-transforming form of the replicate partition instruction, but avoids needing to allocate a separate vector register for storing the source vector, which can help to reduce register pressure.

In another example, rather than mapping the actual data values of the source vector to data elements of the result vector, an index-generating form of the replicate partition instruction may instead populate each partition of the result vector with an incrementing sequence of element indices starting or ending with the element index indicating the selected data element position. The result vector resulting from the index-generating form of the instruction may effectively be viewed as a control vector which can then be used by subsequent instructions to control mapping of data elements from a source vector to a further result vector. For example, the subsequent instruction could be a gather load instruction which loads data values from memory to respective elements of a result vector, with the address offsets used to identify the address of the loaded data values for each element of the result vector being determined based on the corresponding element indices within the control vector. Alternatively, the subsequent instruction could be a generic permute instruction which enables data values from any arbitrary position within a vector to be mapped to any data element position within a result vector, with the control vector resulting from the previously executed index-generating form of the replicate partition instruction specifying which element of the source vector should be mapped to each element of the result.

The source-transforming and load-replicate forms of the replicate partition instruction can be seen as "fused" instructions in which the overall operation of mapping a selected sequence of data values from a source vector to respective partitions within the result vector is controlled by a single instruction. This approach can provide increased performance and may allow more efficient circuitry designed bespoke for this operation to be used.

On the other hand, the index-generating instruction can be viewed as an "unfused" instruction where the overall operation of mapping the data values from a source vector to the partitions of the result vector can be split into two separate instructions, with the index-generating instruction followed by another instruction. This approach may sometimes be simpler to implement in micro-architecture, depending on what other instructions are already supported. For example, if the particular implementation already supports a generic permute instruction which allows any arbitrary mapping of data elements of a source vector to any data element position of a result vector, then it could be more efficient to add the functionality of the index-generating instruction so that the result of the index-generating instruction can be used as an input for controlling the generic permute instruction, as the index-generating instruction may require less additional circuitry than if bespoke circuitry supporting a "fused" instruction such as the source-transforming or load-replicate form of the replicate partition instruction was provided.

Some implementations may support only one of the source-transforming, load-replicate and index-generating forms of the replicate partition instruction discussed above. Other implementations may support more than one of these forms of the instruction, with the instruction opcode or another parameter of the instruction encoding indicating which form is to be executed.

Replicate Elements Instruction

The instruction decoder may support decoding of a replicate elements instruction specifying segment information defining positions of two or more variable size segments within a result vector, where each segment comprises at least one data element of the result vector and at least one segment comprises a plurality of data elements of the result vector. In response to the replicate elements instruction, the instruction decoder controls the processing circuitry to generate a result vector in which, in each respective segment, a repeating value is repeated throughout that segment of the result vector, the repeating value comprising a data value at a selected data element position of the corresponding segment of a source vector or an element index indicating said selected data element position.

Hence, the replicate elements instruction defines multiple variable size segments in the result vector, and in each segment one repeating value is repeated several times in that segment. The repeating value can be different for each segment, and may either be the data value of a selected data element of the corresponding segment in a source vector or an element index of that selected data element. This instruction can be useful for algorithms such as matrix multiplication, where the data structure has a dimension which is smaller than the vector length, where it is often required for a single data value to be multiplied with each of the values within a given row or column of the matrix, so by defining segment corresponding to the row/column structure and selecting a different value as the single value to be repeated in the different segment, this can allow several iterations of the multiplications for several rows/columns to be performed in a single iteration of a vectorised loop, to help improve performance. The replicate element instruction can also be useful for a variety of other kinds of processing operations.

The segment information can be encoded in different ways (e.g. any of the techniques discussed above for the partition information of the replicate partition instruction could be used in a corresponding way for the segment information of the replicate elements instruction). For example, segment mask information comprising marker bits identifying the start or end of each segment within the result vector could be used. Alternatively, the segment information could specify segment size information (e.g. a control mask or scalar value) indicating a number of data elements per segment. Some examples may support segments of different sizes within the same result vector, while other approaches may constrain all segments other than the first or last segment to have the same number of data elements (the first or last segment may have a different size if the size of the active region filled with segments is not an exact multiple of the segment size).

The replicate elements instruction may also specify element selection information indicating the selected data element position for each segment (which defines which particular element of the source vector or which particular element index is repeated throughout each segment). The element selection information could be encoded in different ways. In some cases the encoding of the instruction may specify the element selection information independently for each segment (e.g. a control mask may have active bits identifying the selected element position in each segment). In other some cases, the encoding of the instruction may constrain all segments to have the same selected data element position. For example, the element selection information could be a scalar value specifying a value N, to indicate that the $N^{th}$ element of each segment is to be the selected element.

In some examples, the replicate elements instruction may specify active portion information indicative of an active portion of the result vector comprising the plurality of segments, and in response to the replicate elements instruction the instruction decoder may control the processing circuitry to generate the result vector in which at least one data element outside the active portion has a predetermined value or a value of a corresponding data element of a destination register for storing the result vector. This allows remaining portions of the result vector to be "masked off" so that they are not filled with repeating elements, which can be useful for example if the data structure being processed has a dimension such that the vector length cannot be filled entirely with rows or columns of the data structure.

However, other examples may consider the entire result vector to be an active portion which is filled with repeating values in each segment based on the replicate elements instruction. In this case, there is no need to specify any active portion information.

In a similar way to the replicate partition instruction, source-transforming, load-replicate and index-generating forms of the replicate elements instruction may be provided. Again, any particular implementation can choose to implement only one of these forms of the instruction, or two or more. The circuitry used to implement the replicate elements instruction may vary depending on the micro-architectural implementation (e.g. a general purpose permute unit could be used, or a more bespoke circuit designed to support a more limited subset of element mappings as required by the replicate elements instruction). Hence, in general any circuitry which provides the behaviour defined at the architectural level in response to the decoded replicate elements instruction can be used.

Note that while the replicate partition instruction and replicate elements instruction may support an encoding where two or more partitions are defined with at least one partition comprising more than one data element of the result vector, there may also be valid encodings of these instructions which permit the result vector to be defined with other configurations of partitions, e.g. with a single partition only, or with a number of partitions which each comprise a single data element. This can allow the same instructions to be used for performing other types of operations such as mapping each element of the source vector direct to the corresponding element of the result vector within the active region, or repeating the same data element of the source vector throughout the result vector. Supporting such additional encodings may make the provision other instructions in the ISA for controlling such operations unnecessary, to allow more efficient use of the encoding space. Nevertheless, the encoding of the replicate partition instruction and replicate element instruction may be such that at least one pattern of bit values representing the replicate partition instruction or replicate element instruction signifies that the result vector is to comprise multiple partitions with at least one partition comprising more than one data element.

Some implementations may implement only one of the replicate partition instruction and the replicate elements instruction. For example, the replicate partition instruction can be useful for FFT algorithms, even if the replicate elements instruction is not provided, and the replicate elements instruction can be useful for frame by frame matrix multiplications even if the replicate partition instruction is not provided, as shown in the examples below.

However, implementations which support both the replicate partition instruction and the replicate elements instruction are particularly useful as they allow matrix multiplications using matrices of relatively small dimension to be calculated with multiple rows of the matrix being handled in a single iteration of a vectorised loop.

The instructions discussed above can also be implemented within a virtual machine. Virtual machines can be used to emulate the processing hardware of a given architecture on a system which does not itself have that hardware. A general purpose computer may execute a virtual machine program to provide an instruction execution environment which corresponds to that of an apparatus which does have the hardware supporting the replicate partition instruction or replicate elements instruction, so that these instructions can be executed within the virtual machine to give the same results as if the hardware was actually provided. The virtual machine computer program may be stored on a non-transitory recording medium.

EXAMPLE EMBODIMENTS

FIG. 1 is a block diagram of a system in which the techniques of the described embodiments may be employed. In the example shown in FIG. 1, the system takes the form of a pipelined processor. Instructions are fetched from an instruction cache 15 (which is typically coupled to memory 55 via one or more further levels of cache such as a level 2 cache 50) by the fetch circuitry 10, from where they are passed through decode circuitry 20 which decodes each instruction in order to produce appropriate control signals for controlling downstream execution resources within the pipelined processor to perform the operations required by the instructions. The control signals forming the decoded instructions are passed to issue stage circuitry 25 for issuing to one or more execution pipelines 30, 35, 40, 80 within the pipelined processor. The execution pipelines 30, 35, 40, 80 may collectively be considered to form processing circuitry.

The issue stage circuitry 25 has access to the registers 60 in which data values required by the operations can be stored. In particular source operands for vector operations may be stored within the vector registers 65, and source operands for scalar operations may be stored in the scalar registers 75. In addition, one or more predicates (masks) may be stored in predicate registers 70, for use as control information for the data elements of vector operands processed when performing certain vector operations. One or more of the scalar registers may also be used to store data values used to derive such control information for use during performance of certain vector operations.

The source operands and any associated control information can be routed via a path 47 into the issue stage circuitry, so that they can be dispatched to the appropriate execution unit along with the control signals identifying the operation (s) to be performed to implement each decoded instruction. The various execution units 30, 35, 40, 80 shown in FIG. 1 are assumed to be vector processing units for operating on vector operands, but separate execution units (not shown) can be provided if desired to handle any scalar operations supported by the apparatus.

Considering the various vector operations, arithmetic operations may for example be forwarded to the arithmetic logic unit (ALU) 30 along with the required source operands (and any control information such as a predicate), in order to enable an arithmetic or logical operation to be performed on those source operands, with the result value typically being output as a destination operand for storing in a specified register of the vector register bank 65.

In addition to the ALU 30, other execution units 35 may be provided, for example a floating point unit (FPU) for performing floating point operations in response to decoded floating point instructions, and a vector permute unit 80 for performing certain permutation operations on vector operands. In addition, a load/store unit (LSU) 40 is used for performing load operations in order to load data values from the memory 55 (via the data cache 45 and any intervening further levels of cache such as level 2 cache 50) into specified registers within the register sets 60, and for performing store operations in order to store data values from those registers back to the memory 55.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) may be provided, for example register renaming circuitry to map the architectural registers specified by the instructions to physical registers from a pool of physical registers within the register bank 45 (the pool of physical registers typically being larger than the number of architectural registers), thereby enabling certain hazards to be removed, facilitating more use of out of order processing. In addition, a reorder buffer may typically be provided to keep track of the out of order execution, and to allow the results of the execution of the various instructions to be committed in order.

In the described embodiments, the circuitry of FIG. 1 is arranged to execute vector operations on vector operands stored in the vector registers 65, where a vector operand comprises a plurality of data elements. For certain vector operations performed on such a vector operands (such as arithmetic operations), the required operation may be applied in parallel (or iteratively) to the various data elements within the vector operand. Predicate information (also known as a mask) may be used to identify which data elements within a vector are active data elements for a particular vector operation, and hence are data elements to which the operation should be applied.

Figure 2:
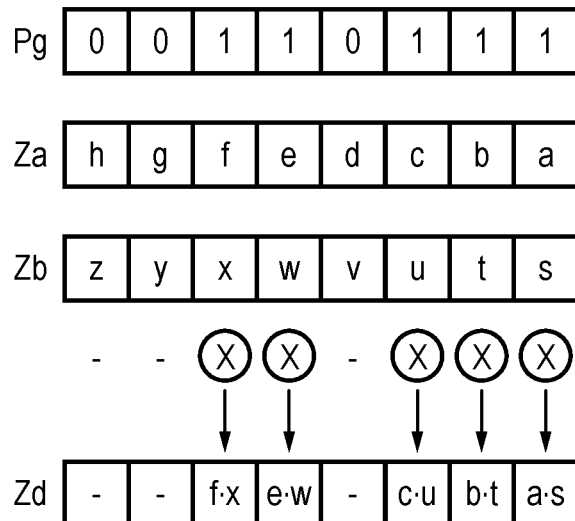
FIG. 2 shows an example of vector processing.

FIG. 2 shows an example of a vector operation performed on two vector operands Za, Zb stored in corresponding vector registers 65, under control of a predicate value Pg stored in one of the predicate registers 70. In this example, the independent operation applied to each vector lane is a multiply operation, so that the elements of the result vector Zd corresponding to active bits (set to 1) in the predicate Pg are set to the result of multiplying the elements at corresponding positions of the operands Za, Zb. The elements of the result vector Zd corresponding to inactive bits (0) of the predicate Pg can be set to zero, or may retain the previous value associated with the corresponding portion of the destination register. Such predication can be useful for supporting conditional operations where an earlier instruction may set the predicate value Pg in dependence on whether elements of a vector meet certain criteria, and/or for marking some upper elements of a vector as inactive in the final iteration of a vectorised loop when there is not enough data to completely fill a vector operand.

In some micro-architectural implementations, processing logic may be provided to perform the operations on each of the elements of a vector in parallel. However, other implementations may provide processing hardware corresponding to a smaller data width than the entire vector length, and in this case the vector instruction may be processed in multiple passes through the narrower hardware, each pass generating a corresponding subset of elements of the result vector. Some implementations may even generate each element of the result sequentially using hardware of width corresponding to a single data element. While performance is greatest in embodiments that can process wider vectors in parallel, even in embodiments which process some portions of the vector sequentially, vectorisation can still improve performance relative to purely scalar instructions, due to the reduced instruction fetch, decode and issue bandwidth required for processing a given amount of data.

While FIG. 2 shows an example where each vector includes 8 data elements, this is just an example and other implementations may use other configurations, or could support vector operations on vectors with variable numbers or sizes of data elements. The instruction set architecture may be designed for use with a range of micro-architectural implementations which may provide different sizes of vector processing paths and vector registers, so that the same instructions can be executed on different platforms operating with different vector sizes. An implementation using a shorter vector length may require more iterations of a vectorised loop than an implementation using a longer vector length (the vectorised loop being a loop comprising vector instructions where each iteration in the loop loads a chunk of data from memory, processes each element of the loaded vector according to some defined series of processing operations, and stores the result back to memory).

Matrix multiplication involving small dimensions such as 2×2, 3×3, 4×4 etc. can be a common use case in various algorithms involved in HPC, DSP and Networking domains. It is also the backbone of block-based transform operations in which a small-dimension square matrix multiplication operation is performed on a larger frame data such as pixel values, as is commonly used in video and image processing algorithms. A matrix with small dimensions poses a unique problem for vectorization, in which the dimension of input data forms the limiting factor for optimization and not the vector length. Hence increasing vector length will not improve performance and these algorithms cannot scale up with higher vector length. Vector implementations with a wide vector length are most affected by this problem. The example below illustrates this problem.

Consider a M×M matrix multiplication, with any arbitrary value for M. For example, M=3:

$$\begin{vmatrix} [a] \\ a0 & a1 & a2 \\ a3 & a4 & a5 \\ a6 & a7 & a8 \end{vmatrix} \times \begin{vmatrix} [b] \\ b0 & b1 & b2 \\ b3 & b4 & b5 \\ b6 & b7 & b8 \end{vmatrix} = \begin{vmatrix} [c] \\ c0 & c1 & c2 \\ c3 & c4 & c5 \\ c6 & c7 & c8 \end{vmatrix}$$

where c0=a0b0+a1b3+a2b6, c1=a0b1+a1b4+a2b7, c2=a0b2+a1b5+a2b8, c3=a3b0+a4b3+a5b6, c4=a3b1+a4b4+a5b7, c5=a3b2+a4b5+a5b8 c6=a6b0+a7b3+a8b6, c7=a6b1+a7b4+a8b7, c8=a6b2+a7b5+a8b8.

An example of some scalar code for an M×M matrix multiplication is:

```
void matrixMultiplicationScalar (int *c, int *a, int *b, int M)
{
  int i, j, k;
  int temp;
  for (i=0; i<M; i++)
  {
    for (j=0; j<M; j++)
    {
      temp =0;
      for (k=0; k<M; k++)
      {
        temp += a[ (i*M) +k] * b [ (k*M) +j];
      }
      c[ (i*M) + j = temp;
    }
  }
}
```

The scalar approach is slow as each separate multiplication is performed in a separate iteration of the loop, with a separate multiply-accumulate instruction.

One approach for vectorising scalar matrix multiplication is by reading an entire row/column (or part of a row/column if the vector length is smaller than the row/column length) to a vector register and processing multiple elements in parallel to generate the output values. This approach scales up well with vector length as long as there are enough data to fill the vector register in each iteration, i.e. for matrixes with dimension greater than that of vector length. With higher vector length, more data can be packed in the vector register, thereby effectively reducing the number of iterations and improving performance.

However, in many algorithms in DSP, HPC and Networking, the matrix operations are performed on small dimensions. Further, in some cases, these dimensions are not a multiple of 2. Also in many image and video processing algorithms, operations are performed on a bigger frame of data, so that even though the matrix operations itself is on smaller dimension, the operation is repeated on a block by block pattern to cover an entire frame data. A simple vector approach for implementing M×M matrix multiplication of small dimension with variable vector length(VL) would be of the form:

```
void matrixMultiplication (int *c, int *a, int *b, int M, int VL)
{
  int i, j, k;
  int mask = M;
  VecReg v0;
  VecReg v1;
  VecReg v2;
  for ( j=0; j<M; j =j+1)
  {
    v0 = VecDup (mask, 0, VL) ;
    for (k=0; k<M; k = k + 1)
    {
      v1 = LoadVecDup (mask, &a [ j*M + k], VL) ;
      v2 = VecLoad (mask, &b [k*M] , VL) ;
      v0 = VecMla (mask, v0, v1, v2, VL) ;
    }
    VecStore (mask, &c [ j*M] , v0, VL) ;
  }
}
```

However, this approach for vectorising a matrix multiplication has serious performance drawbacks if the dimension of matrix is smaller compared to vector length, i.e. for a M×M matrix, where VL/M>=2, VL is the vector length (number of elements per vector), and M is the width of the matrix.

For SIMD machines with wide vector length, this approach for vectorising a matrix multiplication of small dimension results in:

Using a wide vector register for operating on a small row/column dimension will result in the partial usage of vector register, in which most of the lanes are not used. This results in an implementation with a large number of sparsely filled vector registers and significantly reduces the lane usage The design will not scale with machine with higher vector length. Since only one row/column can be packed in a vector register, the algorithm gives same performance irrespective of the Vector Length.

The optimization scope of design is limited by width of the matrix and is independent of vector length.

Hence, it is desirable to provide instruction set architecture features which enable vector processors to operate on smaller data dimensions, but at the same time utilizing the benefit of higher vector length. The instructions below enable a vector partitioning (or "vector-of-vectors") approach, in which data of different dimensions can be processed in a single vector register.

Below are described various examples of instructions, called a "replicate partition instruction", which allow the programmer to replicate a portion of a vector register into another register. Partitions of arbitrary size can be defined within a result register, and a selected portion of a source register can be repeated in each partition. This helps to implement the vector-of-vectors approach for wide vector length machines in algorithms dealing with small dimension of data, and thereby allowing to scale up the performance with vector length in a vector length agnostic way. Example use cases showing how the instructions can help speed up arithmetic operations will be discussed below, but first a number of variants of the instructions themselves are described. In the examples discussed below, for ease of explanation the "active bits" in the control mask are considered to be those bits equal to 1, and the inactive bits are the bits equal to 0. However, it will be appreciated that other implementations could treat the '0' bits as the active bits and '1' bits as inactive.

Figure 3:
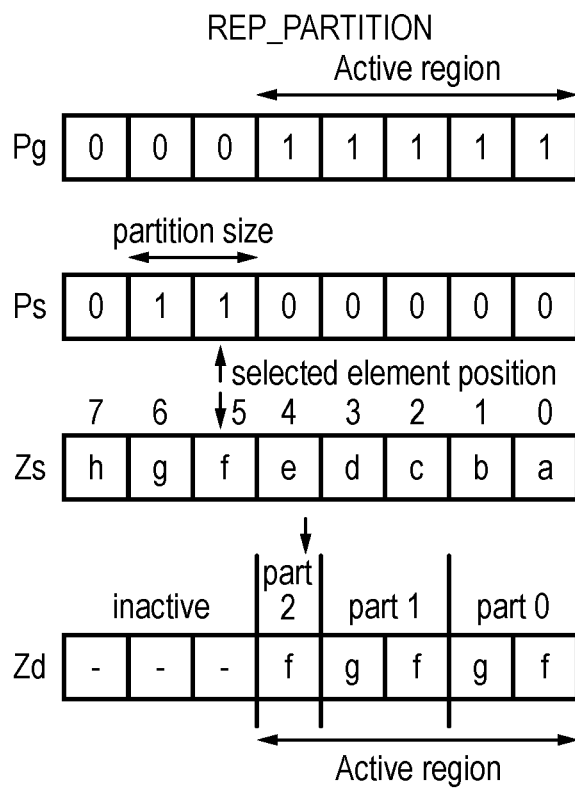
FIG. 3 shows a first example of a source-transforming form of a replicate partition instruction.

FIG. 3 shows a first example of a source-transforming form of a replicate partition instruction, which specifies a destination vector register Zd for storing a result vector, a predicate register Pg specifying a control mask value for identifying an active portion of the result vector, a source vector register Zs for storing a source vector, and a second predicate register Ps specifying a partition mask value which provides partition information identifying a configuration of a number of partitions within the result vector as well as element selection information identifying the position of a selected element of the source vector marking the start of a sequence of adjacent data elements to be mapped to each partition.

In this example, the active portion is identified as the portion of the result vector corresponding to the active bits of the control mask Pg. The partition size can be defined either by the size of the portion of Ps between the first and last active bits, or by the portion of Ps in which all bits are set active (for the example with partition size of 2 shown in FIG. 3 both options are equivalent, but if the partition size is 3 or more then with the first approach intervening bits may take any value while with the second approach the intervening bits between the first/last active bits would also be active). These parameters define the configuration of the partitions within the result vector, with a number of partitions each of the specified size being repeated until the end of the active region is reached (if the size of the active region is not an exact multiple of the partition size then the last repetition is truncated). For example, in FIG. 3 the active region comprises the lower 5 data elements of the result vector Zd, the partition size is 2 data elements (as the first and last active bits in Ps are next to each other), and so the first two partitions will comprise 2 data elements each and the final truncated partition comprises a single data element. The remaining 3 elements of the result vector Zd form the inactive portion of the vector.

When the instruction is executed, the decode circuitry 20 controls the vector permute unit 80 to generate the result vector Zd in which each partition is filled with the data values of a sequence of elements of the source vector Zs starting from the selected element position. In the example of FIG. 3, the selected element position is element 5 of Zs, and so each partition of the result vector is filled with a sequence of data values starting with the data value f in element 5. The partitions comprising 2 data elements therefore comprise the sequence of data values f, g and the partition comprising a single data element has that element set to the data value f of the selected data element position.

Hence, this instruction can be used to repeat multiple instances of the same sequence of data values throughout a vector, which can be useful for processing of matrices or other data structures of relatively small dimension compared to the vector length as discussed below.

Figure 4:
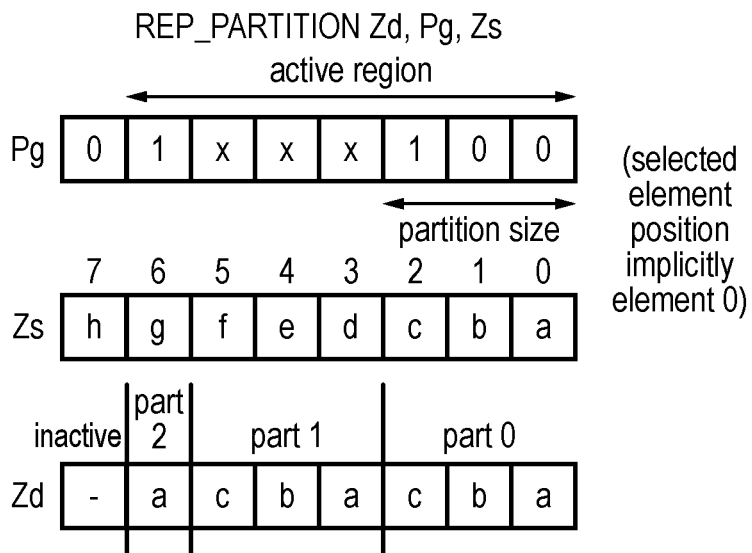
FIGS. 4 to 6 show a second example of a source-transforming form of a replicate partition instruction.

FIG. 4 shows a second example of the replicate partition instruction, which again specifies a source register Zs and destination register Zd, but which specifies a single predicate register Pg for defining the active region and the partition configuration. In this example, the selected data element position (marking the start of the sequence of data values to be extracted from the source vector) is implicit, assumed by default to be element 0. With this encoding, the first active bit in predicate value Pg indicates the partition size (the size being encoded in terms of the number of bits between the first active bit and the least significant bit). The last active bit of the predicate value indicates the size of the active region of the result vector Zd (again defined relative to the least significant bit). Bits of Pg between the first and last active bits are marked with "x" to indicate that they can take any value as they do not affect the result.

Hence, in the example of FIG. 4, the partition size is 3 (as the first active bit is at the third least significant bit of Pg) and the active region size is 7 (as the last active bit is at the seventh least significant bit of Pg). Hence, the result Zd is configured with three partitions, the first two comprising 3 elements each and the last partition comprising a single element as it is truncated to fit in the active region. The last element of Zd is inactive. Hence, when the instruction is executed, a sequence of data values a, b, c starting from the least significant data element position of Zs is mapped to the lower two partitions, and the last truncated partition comprises a partial sequence comprising data value 'a'.

Figure 5:
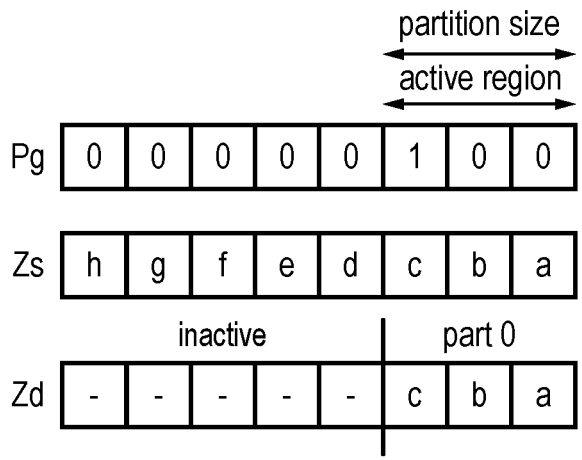
Figure 6:
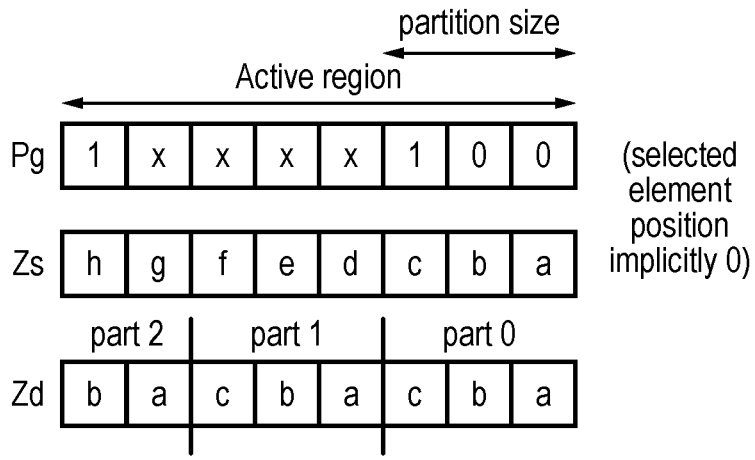

FIG. 5 shows a second example using the same encoding technique as in FIG. 4. As shown in FIG. 5, if there is only one active bit in the predicate register Pg, then the partition size and active region size are the same, and the instruction will simply populate the active region of the destination register Zd with the corresponding elements of Zs, with the remaining elements of Zd inactive. As shown in FIG. 6 which also uses the same encoding technique, to replicate a partition of the specified size throughout the entire vector register, the most significant bit of the mask Pg can be marked as active.

The inactive elements of the result vector Zd can be handled in different ways. For example, the inactive elements outside the active region can each be filled with a predetermined data value, such as zero ("zeroing predication"). Alternatively, the previous value stored in those inactive elements of the destination register Zd may be retained, so that the newly allocated partitions are merged with the previous contents of Zd ("merging predication").

Several other variants of the replicate partition instruction can also be provided. For example, an unpredicated variant of the instruction shown in FIG. 3, which does not specify a control mask Pg, may be provided which controls the processor to replicate the partition throughout the destination register. The partition size and selected data element position can still be encoded using Ps in the same way as in FIG. 3, or alternatively the approach shown in FIG. 4 can be used for defining the partition size.

Also, while FIGS. 3 to 6 show constructive encodings where the instruction includes separate register specifiers for the source and result vectors respectively, other examples may use a destructive encoding where a single register specifies both the source value and the location to which the result vector is to be written. In this case, the result of the replicate partition instruction overwrites the source operand.

Scalar variants of these instructions can also be provided in which any of the partition size, active region size, and selected data element position can be encoded through scalar values. For example:
1.

---

REP_PARTITION Zd, Zs, Rs1, Rs2 (constructive), or
REP_PARTITION Zds, Rs1, Rs2 (destructive),

--- where Rs1 indicates the partition size, and Rs2 indicates the size of the active region. In this example, the active region is assumed to start by default at vector lane 0, and the selected data element position is implicitly defined as element 0, as in the example of FIG. 4. For implementing the "vector of vectors" approach discussed herein, it would be expected that Rs1<Rs2. However, the instruction may also support valid encodings where Rs1>Rs2. If the partition size is defined as greater than the active region size, then the result would be to copy the elements in the region marked as the active region by Rs2 from the source vector to the corresponding elements of the result vector (i.e. there is only one partition which is truncated because of the smaller active region size).

2. corresponding unpredicated versions of the two previous examples:

---

REP_PARTITION Zd, Zs, Rs1 // Constructive
REP_PARTITION Zds, Rs1 // Destructive

--- where Rs1 specifies the partition size, and again the selected data element position is implicitly element 0. If Rs1 is less than the vector length, the result is that Zd comprises at least two partitions each of which is filled with a sequence of data values starting from element 0 of Zs. If Rs1 is greater than or equal to the vector length, the result would be to simply copy the source vector Zs direct to the destination vector Zd.

3. Unpredicated variants, where the active region is the entire vector, and the partition size and selected data element position are specified by scalar values:

---

REP_PARTITION Zd, Zs, Rs1, Rs2 (constructive)
REP_PARTITION Zds, Rs1, Rs2 (destructive).

---

In one example, Rs1 and Rs2 could directly indicate the partition size and selected data element position respectively.

Alternatively, Rs1 and Rs2 can respectively indicate the start and end positions of the sequence of elements to be extracted from Zs, i.e. the partition size corresponds to Rs2−Rs1+1. This provides a scalar equivalent to the encoding of Ps shown in FIG. 3, and allows for the sequence of data values to be extracted at an arbitrary location within Zs rather than by default starting at the least significant element. Note that encoding errors, e.g. where Rs2<Rs1, can be handled by treating the instruction as a NOP (a no-operation instruction which has no effect on register state). If Rs1 is greater than the vector length (the total number of elements in the vector), then this could also be handled as a NOP to prevent indeterminate results. If Rs2 is greater than the vector length, this can be handled by assuming that Rs2 was set to indicate the last element of the vector (as the result vector Zd would in this case represent the correct results to be determined for the lower part of the vector intended by the programmer/compiler who wrote the code being executed).

The variants discussed above are all examples of a source-transforming form of the replicate partition instruction, which operates on a source vector stored in a source register Zs or Zd and generates a result vector Zd in which data values from the source register are mapped to data elements of the result depending on the defined partition configuration. This can be viewed as a "fused" operation where one instruction both determines which elements of the source vector should be extracted and permutes those elements to the required positions in the result vector Zs.

Figure 7:
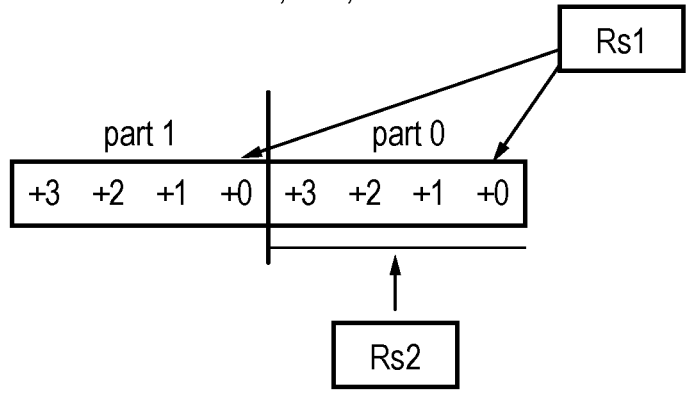
FIGS. 7 to 9 illustrate three examples of an index-generating form of the replicate partition instruction.
Figure 8:
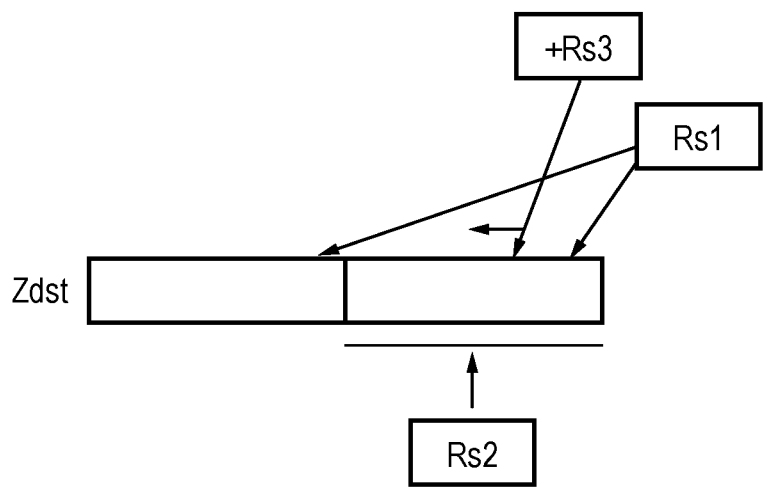
Figure 9:
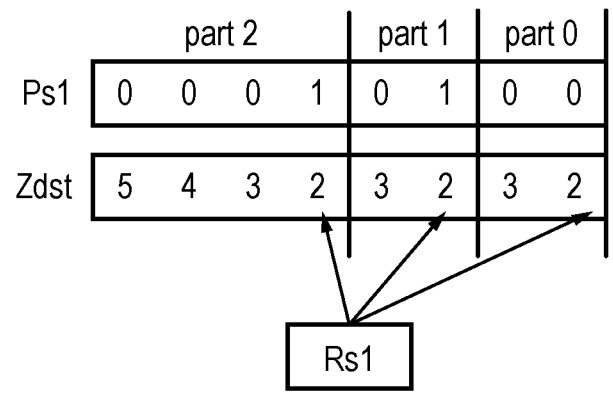

However, an alternative is to provide an index-generating form of the replicate partition instruction as shown in FIGS. 7 to 9 which populates the result vector with the element indices of the required elements from the source vector, but does not actually copy the data values. A subsequent permute instruction can then use the element indices of the result vector to control mapping of the elements indicated by the element indices in the source vector to a further result vector. Alternatively, a subsequent gather-type load instruction, which loads data values from non-contiguous addresses determined using offsets read from a source vector, can use the result generated by the index-generating form of the replicate partition instruction as the vector of offsets, to control loading of the required data values from memory into a destination register. This approach can be regarded as an "split" or "unfused" operation, where the overall operation to pack the required data into a vector register is carried out using two separate instructions (the index-generating replicate-partition instruction and a subsequent load or permute instruction). While this may be slower in terms of performance than a single fused instruction as discussed above, it may simplify the micro-architectural hardware design in some instances, e.g. it can allow reuse of hardware for implementing a generic permute operation or gather load.

FIG. 7 shows a first example of the index-generating form of the replicate partition instruction INCRR Zdst, Rs1, Rs2, where Zdst is the destination register for storing the result vector and Rs1 and Rs2 are scalar values specifying a reset value and stride respectively. This example is an unpredicated instruction and so the entire result vector is considered to be the active portion. A predicated version could also be provided where a parameter of the instruction identifies the active portion. The result vector is filled with a number of repetitions of a repeating pattern of element indices, where Rs1 defines the reset value specifying the index value to be written to the first element of each repeating pattern, and Rs2 defines the stride indicating the period of repetition (the number of elements in each partition). Within each repetition, the indices following the first element are generated by incrementing the previous element index by 1. In the example shown in FIG. 7, for instance, Rs1=0 and Rs2=4, and so the result vector is filled with a number of repetitions of the sequence of elements (3, 2, 1, 0) up to the end of the vector, i.e. the result is [3, 2, 1, 0, 3, 2, 1, 0]. Similarly, if Rs1=2 and Rs2=3, then the result vector would be filled with repetitions of a repeating sequence (4, 3, 2) to give a result of the form [ . . . , 4, 3, 2, 4, 3, 2].

Hence, the stride parameter Rs2 can be seen as equivalent to the partition size information, as it controls the size of each partition, and the reset parameter Rs1 can be seen as equivalent to the element selection information, as it controls the element from which each incrementing sequence of element indices starts.

FIG. 8 shows another example which is similar to FIG. 7, except that the instruction also specifies a third scalar value Rs3 which specifies the increment value representing the difference between the element indices written to neighbouring elements of a single repetition in the result vector. For example, if Rs1=1, Rs2=3 and Rs3=3, then the repeating pattern would be (7, 4, 1) and so a result vector would be filled with a pattern [ . . . , 7, 4, 1, 7, 4, 1]. While FIG. 8 shows an encoding where the increment value is specified in a scalar register, it would also be possible to provide an alternative encoding where the increment value is specified as an immediate value in the instruction encoding itself. This variant of the replicate partition instruction can be used for defining partitions which are each filled with an incrementing sequence of element indices corresponding to non-adjacent elements of a source vector.

It is possible that the parameters of the index-generating forms of the instruction could be set so that some elements of the result vector are set to indices which are larger than the index of the most significant element position of the vector. For example, in the example of FIG. 8, if Rs1=2, Rs2=5 and Rs3=2, and the vector length is 8 elements, the result vector would be [6, 4, 2, 10, 8, 6, 4, 2], and the element indices 8 and 10 in the fourth and fifth element positions would be outside the valid range of element indices for a vector of length 8. In some implementations, an error could be signalled when an out-of-range element index is generated, or the instruction could be treated as a NOP in this case.

However, in some cases the ability to define "invalid" element indices can be useful for implementing "padding" between successive repetitions of the "valid" element indices. If a subsequent instruction simply ignores the "out of range" element indices (e.g. treating those lanes in a similar way to lanes which are masked out by a predicate), then the result can be that the repetitions of the repeating pattern of valid data elements are separated by one or more lanes of padding, which could be useful for some applications. For example, with a zeroing predication, a subsequent permute or load instruction following the index-generating instruction generating the result [6, 4, 2, 10, 8, 6, 4, 2] above would then lead to a result value of the form [R6, R4, R2, 0, 0, R6, R4, R2].

Alternatively, rather than indicating the increment between the indices written to neighbouring elements within the same partition, the third scalar register Rs3 could identify a difference between the starting index for one partition and the starting index for the next partition. In this case, the first partition may comprise a sequence of indices starting at Rs1, the next partition may comprise a sequence of indices starting at Rs1+Rs3, the next partition may comprise a sequence of indices starting at Rs1+2*Rs3, and so on. For example, an encoding with Rs1=2, Rs2=3, and Rs3=5 could result in a result vector populated with indices [ . . . 13, 12|9, 8, 7|4, 3, 2], where |represents the boundary between partitions. This shows how this variant of the instruction can be used to provide "jumps" in the sequence of indices written to the result vector. Hence, this is an example of an instruction where the selected element position for each partition can be different for each partition. The load-replicate or source-transforming forms of the instruction could also specify a similar stride parameter to Rs3 to encode different element positions to use as the start/end of the sequence for each partition.

FIG. 9 shows another variant of the index-generating form of the replicate partition instruction, which specifies a scalar register Rs1 defining which element is the selected element from which the incrementing sequence of element indices starts in each partition, and a control mask Ps1 where the positions of the active bits mark the start of each partition (alternatively, the active bits could mark the end of each partition). With this approach, it is possible to define partitions of varying size within the same result vector, which can be useful for processing data structures with rows of different length (e.g. irregular, triangular or geometric grid patterns). Note that a similar encoding for the partition information using a general mask supporting varying partition length could also be used for the source-transforming or load-replicate types of the replicate partition instruction.

Figure 10:
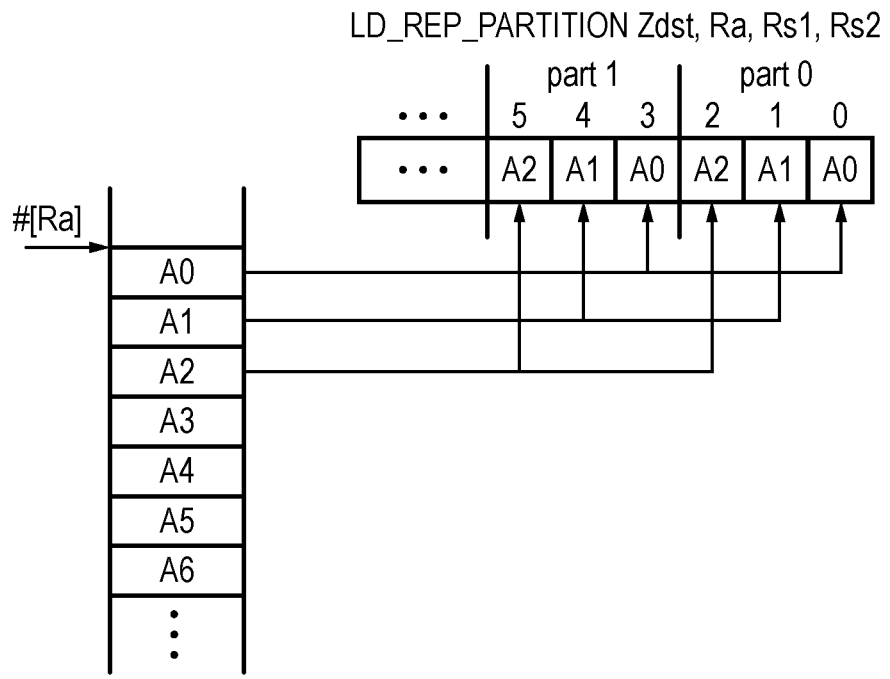
FIG. 10 illustrates an example of a load-replicate form of the replicate partition instruction.

FIG. 10 shows a load-replicate form of the replicate partition instruction. In general, the load-replicate form of the instruction specifies a base address register Ra which stores a value used to calculate a base address #[Ra]. The block of data stored at memory addresses starting at the base address can be viewed as effectively representing the "source vector" from which the sequence of data values is to be extracted and repeated in each partition of the destination register Zdst. That is, if a separate contiguous vector load instruction was executed specifying the same base address #[Ra], this would result in a vector register comprising the sequence of elements A0, A1, A2 . . . corresponding to the data values at the base address #[Ra] and a number of subsequent addresses, and a subsequent source-transforming form of the instruction could be executed as discussed above to populate the partitions of a result vector with elements extracted from the source vector. The load-replicate form of the replicate partition instruction avoids the need for such a separate vector load instruction, by instead operating directly on the "source vector" in memory to give an equivalent result.

The load-replicate form may use any of the techniques discussed above for encoding the partition size/position, active region location, and selected data element position. The particular example of FIG. 10 is similar to the first of the scalar examples of the source-transforming instruction discussed above, in that it specifies two scalar registers Rs1, Rs2 to define the size of the partition and the size of the active region respectively, and by default the selected data element position and active region start position are both implicitly the least significant element position. Hence, if Rs1=3, then the load-replicate instruction would control the processor to load the data values corresponding to the first three elements A0, A1, A2 of "the source vector" stored in memory at addresses starting at the base address #[Ra], and repeat these three data values A0, A1, A2 multiple times within the active region of the vector. However, it will be appreciated that FIG. 10 is just one example, and other examples of the load-replicate form of the replicate partition instruction may mirror the partition encoding used by any of the other examples of the source-transforming form or index-generating form of the instruction described above.

Note that while the load-replicate form of the replicate partition instruction may only need to load certain selected elements from the source vector stored in memory, in practice some hardware implementations may nevertheless load the entire structure A0, A1, A2 . . . (or a sub-portion of the structure) from memory into a buffer, and then pick out the required elements to be written to the result destination register. Hence, the instruction may result in some data being read from the memory even if it is not actually required for generating the result vector. This approach may in some cases be more convenient than reading out selected values from the required offsets. For example, the memory system hardware may impose a minimum size on the block of data read from memory in a single transaction, and so if any part of that block is required then this may require the entire block to be read. For example, if the minimum granularity at which memory is read corresponds to the block of values A0, A1, A2, A3 in the example of FIG. 10, then even though only elements A0, A1, A2 are required for generating the result, the entire block A0-A3 may still be read, but A3 can be discarded by the processor. Hence, it is not essential for the load-replicate instruction to load only the required data values—other values may also be loaded as an artefact of the way the particular memory system operates. Nevertheless, by avoiding the need to consume a vector register, the load-replicate instruction can alleviate register pressure which can help to improve performance.

In the examples given above, the sequence of data values or element indices allocated to each partition starts at the selected data element position. E.g. if the selected data element position is element 1, a partition of size 2 would comprise data values or element indices of elements 1 and 2, a partition of size 3 would comprise data values of element indices of elements 1 to 3, and so on.

However, other examples could populate each partition of the result vector with a sequence ending with the selected data element position. For example, if the selected data element position is element 5, a partition of size 3 would comprise data values or element indices corresponding to elements 3, 4, 5; a partition of size 4 would comprise data values or element indices corresponding to elements 2, 3, 4, 5 and so on. This could be useful for accommodating processing of other types of data structure (e.g. an upper triangular matrix).

Figure 11:
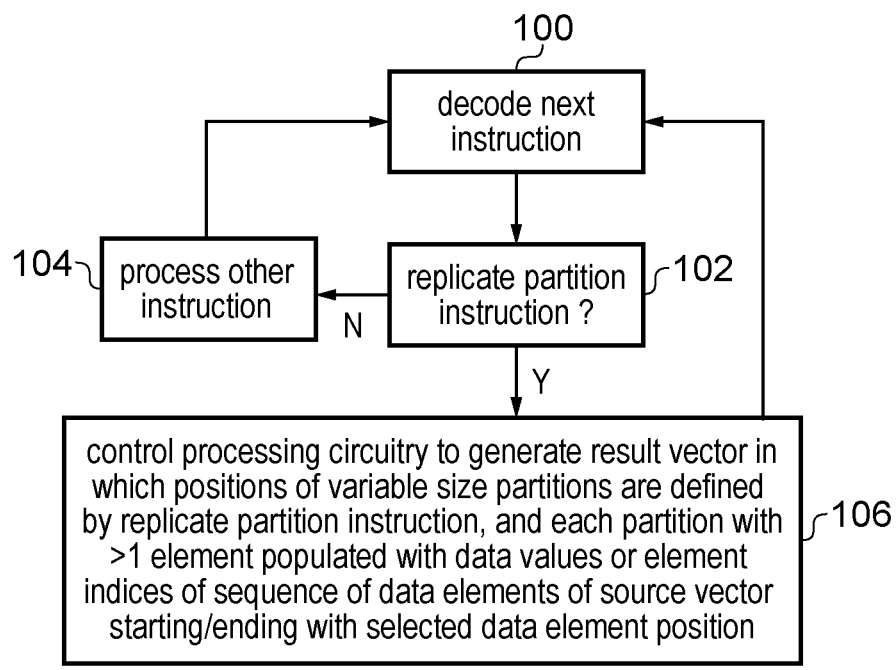
FIG. 11 is a flow diagram illustrating a method of processing a replicate partition instruction.

FIG. 11 shows a flow diagram illustrating a method of processing the replicate partition instruction. At step 100 the instruction decoder 20 decodes the next instruction in the queue of instructions fetched from the cache 15. At step 102, the decoder 20 determines whether the next instruction is a replicate partition instruction. If not, then at step 104 the decoder 20 generates control signals for controlling subsequent stages of the pipeline to perform a processing operation appropriate to the type of instruction encountered, and the method returns to step 100.

If a replicate partition instruction is encountered, then at step 106, the decoder 20 generates control signals for controlling subsequent stages of the processing pipeline to generate a result vector in which positions of a number of variable size partitions are defined by the instruction. Each partition having more than one data element is populated with a sequence of data values from the source vector or element indices starting or ending at a selected data element position.

Another type of instruction supported by the instruction decoder 20 is a replicate elements instruction, which identifies multiple segments within a result vector, each of variable size as specified by the instruction. In response to the replicate element instruction, the decoder 20 controls the processing circuitry to generate a result vector in which, in each respective segment, a repeating value is repeated throughout that segment of the result vector, where the repeating value comprises either a data value of a selected data element of the corresponding segment of a source vector or an element index of that selected data element. Again, this can be useful for speeding up operations such as matrix arithmetic where the dimension of the data being processed is smaller than the vector length. Some example use cases of the instruction are discussed below, but first the instruction itself is described.

FIG. 12 shows a first example of the replicate elements instruction, which specifies a destination vector register Zd for storing the result vector, a source vector register Zs for storing a source vector, and two predicate registers Pg, Ps.

The predicate register Pg provides segment information identifying the size and position of each segment in the result vector. In this example the segment information is encoded as a segment mask in which the positions of the active bits (1 in this example) mark the end of each segment. Hence, this encoding supports segments with different sizes within the same vector. In FIG. 12, for example, Pg is set so that the first segment ends at element 1 such that the first segment has a lowest order vector data element position of 0 and a highest order vector data element position of 1, the second segment ends at element 2 (so comprises only a single element which is both its lowest order element and highest order element), and the third segment ends at element 6 such that the third segment has a lowest order element 3 and a highest order element 6. The predicate register Pg also provides active region information which identifies an active portion of the result vector. In this example, the active region starts at element 0 of the result vector and ends at the element corresponding to the most significant active bit in the predicate Pg (element 6 in this example). Hence, element 7 of the result vector in this example lies outside the active region. With this encoding, both the segment size information and the active region information can be encoded in the same register. It will be appreciated that in other examples the marker bits could represent the start of each segment rather than the end, in a similar way to the encoding of the partition start positions shown in FIG. 9 for the replicate partition instruction.

The second predicate register Ps provides element selection information indicating which of the data elements of the source vector Zs is a selected element within each of the segments identified by Pg. Within each segment, the selected element is the element corresponding to the least significant active bit in Ps. Hence, in the example of FIG. 12, the selected element in the first segment is the lowest order element 0, the selected element in the second segment is element 2, and the selected element in the third segment is element 4 at an intermediate vector data element position other than a lowest order or highest order vector data element position of the third segment. Rather than using the least significant active bit, it will be appreciated that the selected element could also be signalled using the most significant active bit within a given segment.

When the replicate elements instruction is executed, the instruction decoder 20 controls the processing circuitry (e.g. the vector permute unit 80) to generate the result Zd in which, in each segment, the data value of source vector Zs at the selected element position of the corresponding segment is repeated throughout the corresponding segment of the result. For FIG. 12, for example, this results in data value "a" corresponding to element 0 of Zs being repeated throughout the first segment in elements 0 and 1 of the result Zd, data value "c" of element 2 of Zs being mapped to element 2 of Zd, and data value "e" of element 4 of Zs being mapped to each of the elements 3 to 6 of Zd in the third segment.

The elements outside the active region of the result can be set to 0 as shown in FIG. 12 and the "zeroing" example of FIG. 13, or could retain the previous values stored in the corresponding elements of the destination register as shown in the "merging" example of FIG. 13. Note that if Pg is an all true predicate (all active bits), then each element is its own segment. In that case, depending on the corresponding value of Ps, the input is either copied into the output (in case of Ps[ ]=1), or the output remains unchanged or is zeroed (Ps[ ]=0) based on whether instruction is merging or zeroing type. Also, since this variant of the instruction is predicated, if Pg is ALL_FALSE, then output is zeroed or merged depending on the type of the instruction. The instruction can also be used to replicate a particular element throughout the vector register, i.e. to consider the entire vector region as a single segment, by marking the most significant vector lane as active in Pg as shown in FIG. 14. Hence, using this encoding can avoid the need for any separate instruction to be provided for controlling replication of a single element throughout the vector, as this is a valid encoding of the replicate elements instruction which also supports multiple segments.

As shown in FIG. 15, an unpredicated variant of the instruction can also be provided, in which Pg only encodes the segment size, not the active region, and the entire vector register is considered active. In this case the last segment corresponds to the portion of the result vector extending from the next element after the last active bit of Pg up to the end of the vector. For instance, in FIG. 15 the last active bit of Pg is at element 4 and so the last segment of the result vector Zd comprises elements 5 to 7 and these elements of the result are set equal to the data value "f" in the selected element 5 of the corresponding segment of the source vector Zs, as identified by Ps. Note that with the encoding of FIG. 15, if Pg is all false (all inactive bits), then the entire register is considered to be a single segment, and so as shown in FIG. 16, a single data value ("e") from one selected element of the source vector Zs is copied to each of the elements of the result vector Zd (this is similar to FIG. 14 discussed above).

Other variants of the instruction may use different combinations of predicate and scalar values to convey the segment size information, active portion information and element selection information. Some examples of such variants include:

1. REP_ELEMENTS Zd, Pg, Zs, Xs1

A predicated instruction where both the active region information and the segment size information are encoded into Pg in the same way as shown in FIG. 12, but the element selection information is encoded as a scalar variable Xs1 specified in a scalar register or as an immediate value. In this case, the relative position of the selected element with respect to each segment is constrained to be the same in each segment (e.g. Xs1 specifies a value N indicating that the Nth element in each segment is the selected element).

2.

| REP_ELEMENTS Zd, Zs, Xs1, Xs2, Xs3 |
| REP_ELEMENTS Zds, Xs1, Xs2, Xs3 |

Constructive and destructive variants where each of the active region information, segment size information and element selection information are encoded as scalar variables stored in scalar registers. In this case, each segment would have the same size (although the first or last segment can be truncated to fit in the active region if necessary). For example, Xs1 indicates the element position marking the end of the active region, Xs2 indicates the length of each segment, and Xs3 indicates which element of the source vector is the selected element in each segment (relative to the start of the segment). For the constructive variant, separate source and destination registers are defined, so that the source vector is retained following execution of the instruction. For the destructive variant, the same register acts as both source and destination register, so that the source vector is overwritten with the result vector. Generally, it would be expected that Xs1≥Xs2 and Xs2≥Xs3 for most uses of the instructions. If an instruction is encountered where the segment size Xs2 is greater than the size of the active region Xs1, the instruction could be treated as a NOP or a zeroing or merging predication could be applied to mask the parts of the segment which stray into the inactive region. Similarly, cases where the element position indicated by Xs3 is larger than the segment size could be treated as NOP or could result in each segment being masked by zeroing or merging predication. Whether the NOP or the masking approach is taken could be predefined (hardcoded) for a particular implementation, or could vary depending on the type of instruction.

3. The constructive predicated variant shown in example 2 above incurs some cost in encoding space, which can be avoided by providing the destructive variant. Alternatively, a constructive unpredicated example could be provided to save on encoding three separate scalar registers:

REP_ELEMENTS Zd, Zs, Xs1, Xs2

In this case, Xs1 indicates the segment size, Xs2 indicates the selected element position, and the entire result vector is treated as the active portion as in the example of FIG. 15 above. Similarly, an unpredicated destructive encoding could also be provided:

REP_ELEMENTS Zds, Xs1, Xs2.

With the scalar forms of the instruction, note that if the vector length or the size of the active portion is not an exact multiple of the segment size, the last segment is truncated (e.g. if the vector length is 8, the entire vector is considered active, and the segment size is 3, the result vector will comprise three segments of sizes 3, 3, 2 respectively). Alternatively, the first segment could be truncated instead of the last segment.

The examples above are source-transforming forms of the replicate elements instruction, which extract the data values of selected elements from a source vector stored in a vector register 65 and repeat them within corresponding segments of the result vector.

Figure 17:
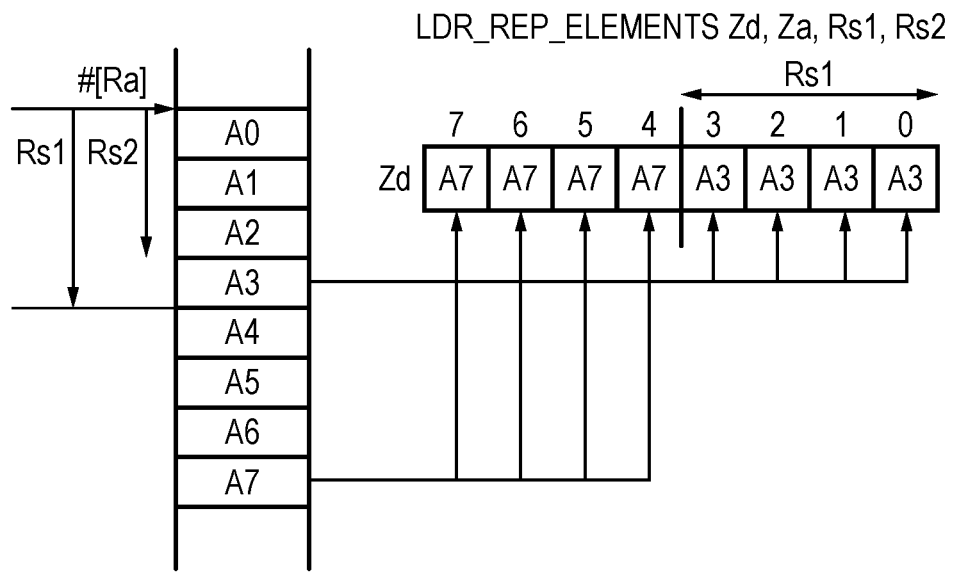
FIG. 17 illustrates an example of a load-replicate form of the replicate elements instruction.

However, as shown in FIG. 17, a combined load-replicate form of the replicate elements instruction can also be provided, in a similar way to the load-replicate form of the replicate partition instruction discussed above for FIG. 10. In this case, the "source vector" from which elements are extracted is stored in memory rather than in a register (with the base address #[Ra] of the source vector in memory being determined based on a value in a base register Za), but otherwise the way in which the segment size, active portion and element selection information is encoded can be the same as any of the variants discussed above for the source-transforming replicate element instruction. The example of FIG. 17 mirrors the unpredicated scalar variant 3 described above. Effectively, Rs1 defines a constant stride corresponding to the segment size and Rs2 defines the element position within a segment. FIG. 17 shows an example where Rs1=4 and Rs2=3, so that the segments comprise four elements each and the fourth element of each segment is replicated throughout the corresponding segment of the destination register Zd. It will be appreciated that similar examples of a load-replicate replicate elements instruction can be provided corresponding to the other variants. For instance, different values for stride and segment length could be specified, to help pad the segment to a required alignment as part of the load operation, or predication can be provided by defining an active region as discussed above.

Figure 18:
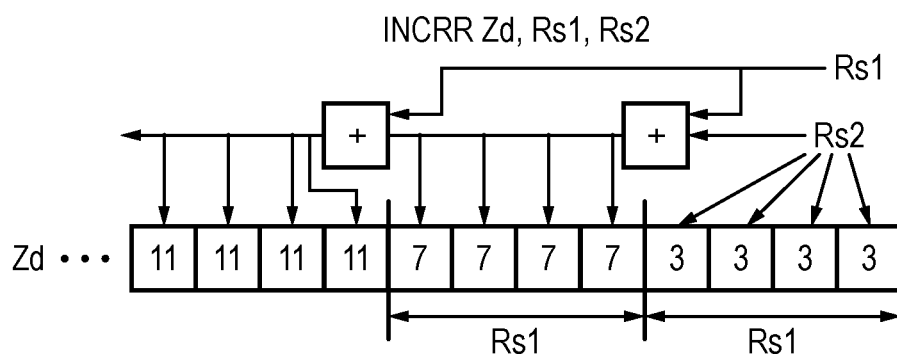
FIG. 18 illustrates an example of an index-generating form of the replicate elements instruction.

As shown in FIG. 18, an index-generating form of the replicate elements instruction can also be provided, similar to FIGS. 7 and 8 above, which triggers the pipeline to replicate the element index of the selected element of the source vector throughout the corresponding segment of the result vector, rather than replicating the data value of that element. For example, an index-generating replicate elements instruction may specify a destination register Zd and two scalar values Rs1, Rs2, where Rs1 defines the size of each segment (and also the amount by which the element index is incremented at the boundary between segments), and Rs2 defines the start value for the first element of the result vector. For example, in FIG. 18 if Rs1=4 and Rs2=3, then the first four elements of the result comprise index 3, the next four elements comprise index 7, and so on. Note that this is effectively the same example as in FIG. 17 for the load-replicate case. Hence, executing a subsequent gather load instruction or permute instruction using the index vector Zd as the load offsets or the elements to be selected by the permute would give the equivalent result as shown in FIG. 17.

Figure 19:
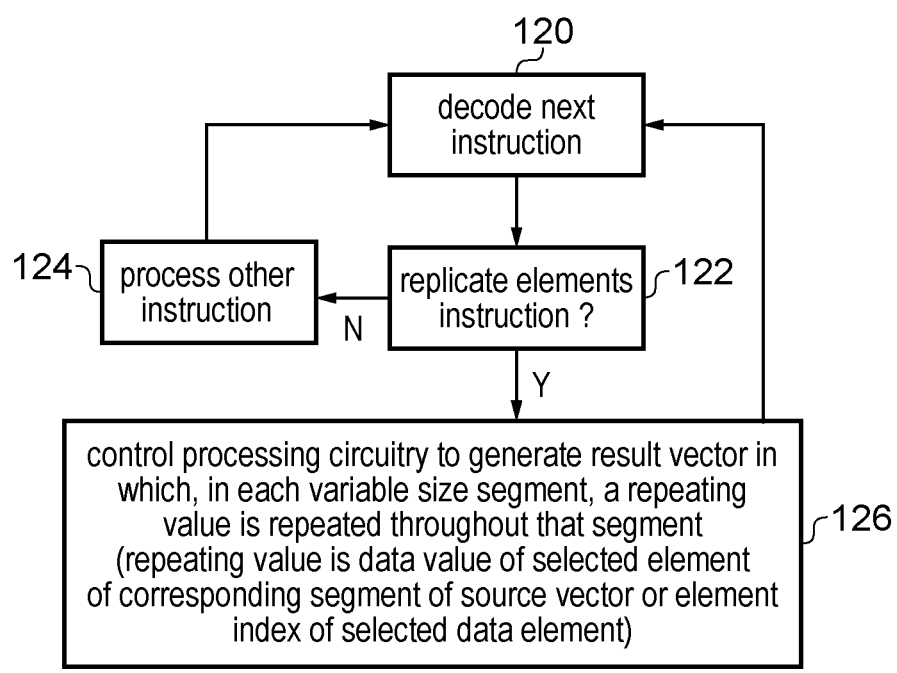
FIG. 19 is a flow diagram illustrating a method of processing a replicate elements instructions.

FIG. 19 shows a flow chart illustrating a method of processing a replicate elements instruction. At step 120 the instruction decoder 20 decodes the next instruction in the queue of instructions fetched from the cache 15. At step 122, the decoder 20 determines whether the next instruction is a replicate elements instruction. If not, then at step 124 the decoder 20 generates control signals for controlling subsequent stages of the pipeline to perform a processing operation appropriate to the type of instruction encountered, and the method returns to step 120.

When a replicate elements instruction is encountered, at step 126 the decoder 20 controls the processing pipeline to generate the result vector in which, in each variable size segment, a repeating value is repeated throughout the segment. The segments can be of different sizes or could all be the same size, and the size/position of each segment is encoded within the instruction. For a predicated instruction, the segments may only be defined within an active portion of the result vector, while for an unpredicated instruction the segments may fill the entire vector. The repeating value for a given segment is either a data value of a selected element of a corresponding segment of a source vector, or an element index of the selected data element. Which element is the selected data element is encoded within the instruction, and can be the same relative position in each segment, or can vary from segment to segment.

Some worked example use cases for the replicate partition instruction and replicate elements instruction will now be described. It will be appreciated that these are not the only use cases for these instructions, but merely illustrate some examples where the instructions can help to improve performance. While the examples show a generic form of the replicate partition instruction or replicate elements instruction, it will be appreciated that the instructions could be implemented according to any of the variants discussed above.

Matrix Multiplication of Dimension M×M

A matrix multiplication on dimension M×M, where N rows can be packed into a single vector register can be implemented using code as follows. Note that this example uses the scalar form of the replicate instructions, in which the mask (number of active elements) is expressed as an integer—see the mask parameter in VecRepElementS and VecRepPartitionS). However, other examples could use a predicate form of the instruction where the mask is expressed in a predicate register instead of a scalar integer register. In this case, the boundary condition check is not required as it would be taken care of when generating the predicate mask as part of the loop iteration (the same applies to other examples below).

```
/* M - dimension of square matrix
 * N - Number of rows that can be packed in single vector register
 */
void matrixMultiplication (int *c, int *a, int *b, int M, int VL)
{
    int i, k;
```

```
int N = VL/M;
int mask = N*M;
VecReg v0;
VecReg v1;
VecReg v2;
VecReg v3;
for (i=0; i<M*M; i= i +mask )
{
  // Checking for boundary condition.
  if ( (i+mask) > M*M)
  {
    mask = M*M - i;
  }
  v0 = VecDup (mask, 0, VL) ;
  v1 = VecLoad (mask, &a [i] , VL) ;
  for (k=0; k<M; k = k + 1)
  {
    // REPLICATE_ELEMENTS
    v2 = VecRepElementS (mask, v1, M, k, VL) ;
    v3 = VecLoad (M, &b [k*M] , VL) ;
    // REPLICATE_PARTITION
    v3 = VecRepPartitionS (mask, v3, M, 0, VL) ;
    v0 = VecMla (mask, v0, v2, v3, VL) ;
  }
  VecStore (mask, &c [i] , v0, VL) ;
}
```

The following worked example shows how this code works, in the context of the example of 3×3 matrix multiplication with vector length=8 (i.e. M=3, N=2, with 2 rows of the matrix packed into one vector in the first iteration and the last row in the second iteration).

$$\begin{vmatrix} a0 & a1 & a2 \\ a3 & a4 & a5 \\ a6 & a7 & a8 \end{vmatrix} \overset{[b]}{\times} \begin{vmatrix} b0 & b1 & b2 \\ b3 & b4 & b5 \\ b6 & b7 & b8 \end{vmatrix} = \begin{vmatrix} c0 & c1 & c2 \\ c3 & c4 & c5 \\ c6 & c7 & c8 \end{vmatrix}$$

$M = 3,$ $N = 2$

Substituting the values in the loop:

```
for (i=0; i<9; i= i+mask )
{
    if ( (i+mask) > 9)
    {
      mask = 9 - i;
    }
    v0 = vec_dup (0, mask) ;
      v1 = VecLoad(a[i], mask) ;
      for (k=0; k<3; k = k + 1)
      {
        v2 = VecRepElementS (mask, v1, 3, k) ;
        v3 = VecLoad (b[k*3], 3) ;
        v3 = VecRepPartitionS (mask, v3, 3, 0) ;
        v0 = VecMla (v0, v2, v3, mask) ;
      }
      VecStore(v0, c[i], mask) ;
}
[Iterations]
mask = 6
i = 0
v1 = a0 a1 a2 a3 a4 a5 0 0
k = 0
v2 = a0 a0 a0 a3 a3 a3 0 0                          // VecRepElmntS ( )
v3 = b0 b1 b2 0 0 0 0 0                             // VecLoad ( )
v3 = b0 b1 b2 b0 b1 b2 0 0                          // VecRepPartS ( )
v0 = a0.b0 a0.b1 a0.b2 a3.b0 a3.b1 a3.b2 0 0        // VecMla ( )
k = 1
v2 = a1 a1 a1 a4 a4 a4 0 0                          // VecRepElmntS( )
v3 = b3 b4 b5 0 0 0 0 0                             // VecLoad( )
v3 = b3 b4 b5 b3 b4 b5 0 0                          // VecRepPartS( )
v0 = a1.b3 a1.b4 a1.b5 a4.b3 a4.b4 a4.b5 0 0        // VecMla( )
k = 2
v2 = a2 a2 a2 a5 a5 a5 0 0                          // VecRepElmntS( )
v3 = b6 b7 b8 0 0 0 0 0                             // VecLoad( )
v3 = b6 b7 b8 b6 b7 b8 0 0                          // VecRepPartS( )
v0 = a2.b6 a2.b7 a2.b8 a5.b6 a5.b7 a5.b8 0 0        // VecMla( )
// Accumulation of v0 in each of this iteration gives :-
              a0.b0    a0.b1    a0.b2    a3.b0    a3.b0    a3.b0    0   0
              a1.b3    a1.b4    a1.b5    a4.b3    a4.b4    a4.b5    0   0
              a2.b6    a2.b7    a2.b8    a5.b6    a5.b7    a5.b8    0   0
              -----------------------------------------------------------
              c0       c1       c2       c3       c4       c5       0   0
// VecStore( )
i = 6
v1 = a6 a7 a8 0 0 0 0 0
mask = 3
k = 0
v2 = a6 a6 a6 0 0 0 0 0                             // VecRepElmntS ( )
v3 = b0 b1 b2 0 0 0 0 0                             // VecLoad ( )
v3 = b0 b1 b2 0 0 0 0 0                             // VecRepPartS ( )
v0 = a6.b0 a6.b1 a6.b2 0 0 0 0 0                    // VecMla ( )
k = 1
```

```
v2 = a7 a7 a7 0 0 0 0 0                              // VecRepElmntS ( )
v3 = b3 b4 b5 0 0 0 0 0                              // VecLoad ( )
v3 = b3 b4 b5 0 0 0 0 0                              // VecRepPartS ( )
v0 = a7.b3 a7.b4 a7.b5 0 0 0 0 0                     // VecM1a ( )
k = 2
v2 = a8 a8 a8 0 0 0 0 0                              // VecRepElmntS ( )
v3 = b6 b7 b8 0 0 0 0 0                              // VecLoad ( )
v3 = b6 b7 b8 0 0 0 0 0                              // VecRepPartS ( )
v0 = a8.b6 a8.b7 a8.b8 0 0 0 0 0                     // VecM1a ( )
    // Accumulation of v0 in each of this iteration gives :-
        a6.b0      a6.b1     a6.b2    0    0    0    0   0
        a7.b0      a7.b1     a7.b2    0    0    0    0   0
        a8.b0      a8.b1     a8.b2    0    0    0    0   0
        ------------------------------------------------------
        c6         c7        c8       0    0    0    0   0
//    VecStore( )
```

Hence, we can see that in the first iteration (i=0) of the outer loop, the use of the replicate elements and replicate partition instructions allows two rows c0-c2 and c3-c5 of the result matrix to be calculated in one iteration of the outer loop, rather than requiring separate iterations as in the comparative example explained earlier. The replicate partition instruction replicates the values from one row of matrix b multiple times within the result vector. The replicate elements instruction defines segments of length M (corresponding to the matrix row size), and in each segment replicates a single element of matrix a that is to be multiplied with each of the values in the corresponding row of matrix b. Over the three iterations, a given lane of vector processing has three multiplications performed (E.g. a0.b0, a1.b3, a2.b6 for the first lane), with the respective multiplications selecting elements going along the row direction in matrix a and along the column direction in matrix b, to give the correct values for matrix c. In the second iteration (i=6) of the outer loop, the remaining row of matrix c is calculated. In this example, the matrices are square matrices (M×M), but it will be appreciated that the replicate elements and replicate partition instructions could also be used to calculate multiplications of matrices where the row length and column length are different.

While this example uses a source-transforming form of the replicate partition and replicate elements instruction, an alternative loop could use the load-replicate form of the instruction instead, so that there is also no need for the VecLoad( ) instruction, or alternative the index-generating form of the instructions could be used followed by a subsequent Vector load or permute instruction.

Frame by Matrix Multiplication

The replicate partition and replicate elements instructions can also be used for an operation where each block within a frame of data values is to be multiplied by a smaller matrix. For example, a M×M matrix multiplication of small dimension may need to be performed between a kernel matrix [z] and each M×M block of an entire frame of data [a]:

```
    [a,input frame data]
a0  a1  a2  a3  a4  a5  a6  a7  ...    [z,kernel]
b0  b1  b2  b3  b4  b5  b6  b7  ...    z0  z1  z2
c0  c1  c2  c3  c4  c5  c6  c7  ...  × z3  z4  z5
d0  d1  d2  d3  d4  d5  d6  d7  ...    z6  z7  z8
                ...
```

This is a common use case in image/video processing were a frame forms the input data (e.g. derived from RGB or Grey scale image) and the kernel forms the transformation matrix. This is a block based operation in which each sub-block of input frame data is multiplied with kernel matrix to generate the output frame data. The traditional vector approach is to perform strided matrix multiplication on each sub block and run the loop for width and height of the frame data:

```
void frameMatrixMultiplicationVectorClassic (int *c, int *a,
    int *z, int M, int frameWidth, int frameHeight, int VL)
{
    int i, j;
    for ( j=0; j< frameHeight; j =j+M)
    {
        for (i=0; i<frameWidth; i= i+M )
        {
            matrixMultiplication (&c[ (j*frameWidth) + i] ,
            &a[ (j*frameWidth) + i] , &z[0], M, framewidth, M, VL) ;
        }
    }
}
```

Here matrixMultiplication ( ) is vectorised as in the traditional approach discussed above on page 13 and will compute the result of each M×M block matrix multiplication. Using the replicate partition and replicate element instructions, instead of performing matrix multiplication on a block by block basis, the above algorithm can be converted to operate on a complete row in the frame by packing data corresponding to multiple M×M blocks together and processing multiple blocks in parallel. A reference implementation using this approach is:

```
void frameMatrixMultiplication (int *c, int *a, int *z, int M,
    int frameWidth, int frameHeight, int VL)
{
    int i, j, k, L;
    int N = VL/M;
    int mask;
    VecReg v0;
    VecReg v1;
    VecReg v2;
    VecReg v3;
    for (j=0; j< frameHeight; j =j+M)
    {
        for (l=0; 1 < M; l++)
        {
            mask = N*M;
            for (i=0; i< frameWidth; i= i+mask )
            {
                if ( (i+mask) > frameWidth)
                {
                    mask = frameWidth - i;
                }
```

-continued

```
v0 = VecDup (mask, 0, VL) ;
v1 = VecLoad (mask, &a [ (j+1) *frameWidth+1] , VL) ;
for (k=0; k<M; k = k + I)
{
    // REPLICATE_ELEMENTS
    v2 = VecRepElementS (mask, v1, M, k, VL) ;
    v3 = VecLoad (M, &z[k*M] , VL) ;
    // REPLICATE_PARTITION
    v3 = VecRepPartitionS (mask, v3, M, 0, VL) ;
    v0 = VecMla (mask, v0, v2, v3, VL) ;
}
VecStore (mask, &c [ (j+1) *frameWidth + i] , v0, VL) ;
    }
  }
 }
}
```

A worked example is as follows (M=3):

| | | | | | | | | | |
|---|---|---|---|---|---|---|---|---|---|
| b0 | b1 | b2 | b3 | b4 | b5 | ... | a0 | a1 | a2 |
| b8 | b9 | b10 | b11 | b12 | b13 | ... | a3 | a4 | a5 |
| b16 | b17 | b18 | b19 | b20 | b21 | ... x | a6 | a7 | a8 |
| b24 | b25 | b26 | b27 | b28 | b29 | ... | | | |
| b32 | b33 | b34 | b35 | b36 | b37 | ... | | | |
| b40 | b41 | b42 | b43 | b44 | b45 | ... | | | |
| = | | | | | | | | | |
| c0 | c1 | c2 | c3 | c4 | c5 | ... | | | |
| c8 | c9 | c10 | c11 | c12 | c13 | ... | | | |
| c16 | c17 | c18 | c19 | c20 | c21 | ... | | | |
| c24 | c25 | c26 | c27 | c28 | c29 | ... | | | |
| c32 | c33 | c34 | c35 | c36 | c37 | ... | | | |
| c40 | c41 | c42 | c43 | c44 | c45 | ... | | | |

Iterations :

| | | | | | | | | | |
|---|---|---|---|---|---|---|---|---|---|
| I=0 | | | | | | | | | |
| | v1: | b0 | b1 | b2 | b3 | b4 | b5 | 0 | 0 |
| M = 3 | | | | | | | | | |
| k = 0->3 | | | | | | | | | |
| k = 0 | v2: | b0 | b0 | b0 | b3 | b3 | b3 | 0 | 0 |
| | v3: | a0 | a1 | a2 | a0 | a1 | a2 | 0 | 0 |
| | v0: | b0.a0 | b0.a1 | b0.a2 | b3.a0 | b3.a1 | b3.a2 | 0 | 0 |
| k=1 | v2: | b1 | b1 | b1 | b4 | b4 | b4 | 0 | 0 |
| | v3: | a3 | a4 | a5 | a3 | a4 | a5 | 0 | 0 |
| | v0: | b1.a3 | b1.a4 | b1.a5 | b4.a3 | b4.a4 | b4.a5 | 0 | 0 |
| | | | | | | | | | |
| k=2 | v2: | b2 | b2 | b2 | b5 | b5 | b5 | 0 | 0 |
| | v3: | a6 | a7 | a8 | a6 | a7 | a8 | 0 | 0 |
| | v0: | b2.a6 | b2.a7 | b2.a8 | b5.a6 | b5.a7 | b5.a8 | 0 | 0 |
| Accumulating: | | | | | | | | | |
| | v0: | c0 | c1 | c2 | c3 | c4 | c5 | 0 | 0 |
| | | | | | | | | | |
| I=1 | | | | | | | | | |
| | v1: | b8 | b9 | b10 | b11 | b12 | b13 | 0 | 0 |
| M = 3 | | | | | | | | | |
| k =0->3 | | | | | | | | | |
| k=0 | v2: | b8 | b8 | b8 | b11 | b11 | b11 | 0 | 0 |
| | v3: | a0 | a1 | a2 | a0 | a1 | a2 | 0 | 0 |
| | v0: | b8.a0 | b8.a1 | b8.a2 | b11.a0 | b11.a1 | b11.a2 | 0 | 0 |
| k=1 | v2: | b9 | b9 | b9 | b12 | b12 | b12 | 0 | 0 |
| | v3: | a3 | a4 | a5 | a3 | a4 | a5 | 0 | 0 |
| | v0: | b9.a3 | b9.a4 | b9.a5 | b12.a3 | b12.a4 | b12.a5 | 0 | 0 |
| k=2 | v2: | b10 | b10 | b10 | b13 | b13 | b13 | 0 | 0 |
| | v3: | a6 | a7 | a8 | a6 | a7 | a8 | 0 | 0 |
| | v0: | b10.a6 | b10.a7 | b10.a8 | b13.a6 | b13.a7 | b13.a8 | 0 | 0 |
| Accumulating: | | | | | | | | | |
| | v0: | c8 | c9 | c10 | c11 | c12 | c13 | 0 | 0 |

Hence, the I=0 iteration calculates the first row of two different M×M matrix multiplications (calculating row c0-c2 for one multiplication and c3-c5 for the next one). Similarly, the I=1 iteration calculates the second row of each of these two M×M matrix results, and so on for the rest of the rows and the subsequent portions of the frame. This can result in a significant reduction in the instruction count over the processing of the whole frame, with the performance benefit scaling depending on vector length and the number of M×M matrix rows that can be packed in one register.

Frame by Frame Matrix Multiplication

A further example use case is shown in FIGS. 20-22. This example uses the replicate elements instruction but not the replicate partition instruction. As shown in FIG. 20, a frame can be divided into multiple tiles, and these tiles may be of a different size. For example, each section of the frame in FIG. 20 represents a tile of 2×2 or 4×4 size. These tiles are multiplied with the corresponding tile in the other frame to generate the resultant frame. Such a tile-based approach is useful for many video processing algorithms. Assuming a vector processing engine with wide vector registers, multiple tiles of different sizes can be processed in a single iteration of a vector loop. FIGS. 20-22 considers an example in which a vector engine with vector length VL=6 is used to perform the matrix multiplication. As shown in this example, multiplication of two adjacent tiles of different sizes (2×2 and 4×4) is done in the same iteration. Note that iterations 1 and 2 calculate the upper 2×2 tile t0-t3 and iterations 3 and 4 calculate the lower 2×2 tile w0-w3 (with an unshown predicate operation used to mask out the appropriate parts of some of the vector registers v1-v8), while all 4 operations calculate parts of the 4×4 tile u0-u15. Using the replicate element operation, the operation can be done with fewer instructions than if each vector instruction could only operate on a single 2×2 or 4×4 tile.

Processing of N-Dimensional Data Structures

The examples above discuss use of the replicate partition and replicate elements instructions for handling processing of two-dimensional grid structures. However they can also be used for handling 3-dimensional or N-dimensional structures.

Processing of Grids with Varying Row Size

The instruction variants which support varying partition/segment size within the same register (such as FIG. 9 for the replicate partition instruction or FIG. 12 for the replicate element instruction) can be useful for supporting processing of other non-rectangular grid patterns, including the following:

Irregular grid pattern (with row length in each row specified by a mask). This is useful for sparse matrices and nested while loops.

Triangular grid pattern, where each row is of length 1, 2, 3, 4, . . . , N (or each row is of length N, N−1, N−2, . . . , 1)—useful for triangular matrices and when nested loops have dependent loop limits.

Geometric grid pattern, having rows of length scaling with a geometric sequence such as 1, 2, 4, 8, . . . . This is particularly useful for Fast Fourier Transform (FFT) or discrete wavelet transform (DWT) algorithms.

FFT

Figure 23:
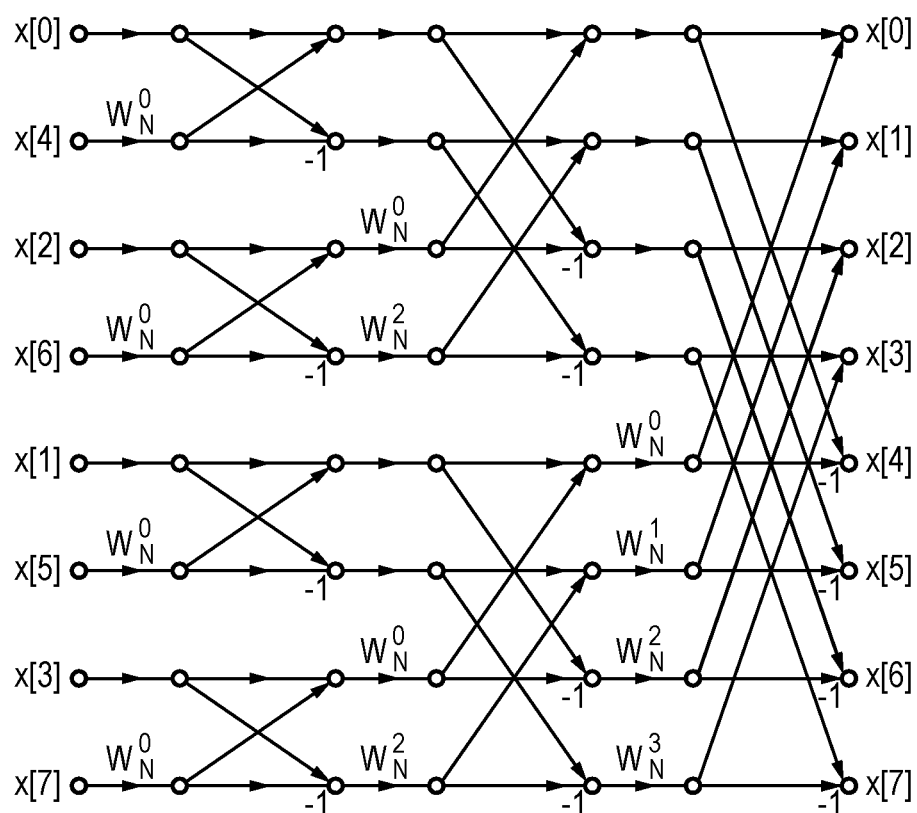
FIG. 23 shows an example of an FFT calculation for which the replicate partition instruction can be used.

As shown in FIG. 23, the replicate partition instruction can also be used to replicate the twiddle factors for FFT algorithm for a given stage. When the number of twiddle factors in a given stage is less than the vector length, then the twiddle factors can be replicated in several partitions and can be processed in parallel. For example, in FIG. 23, considering an 8-element vector, in stage 2 we can replicate the twiddle factor as follows:

[W0, W2, -, -, -, -, -, -]→[W0,W2, W0, W2, W0,W2, W0,W2].

Hence, this is an example of a use case where the replicate partition instruction can be used separately from the replicate elements instruction.

Figure 24:
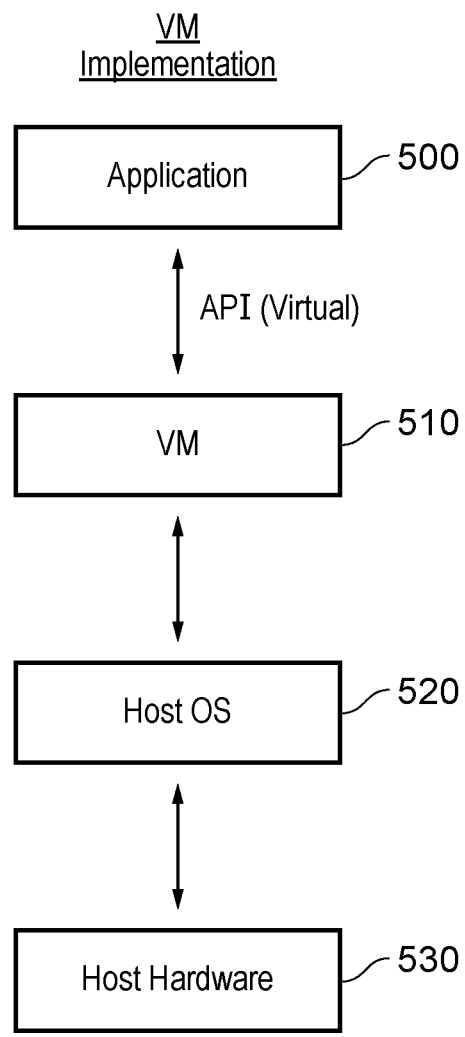
FIG. 24 shows a virtual machine implementation which can be used.

FIG. 24 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Other example arrangements are set out in the following clauses:

(1) An apparatus comprising:
processing circuitry to perform vector processing operations on vectors comprising a plurality of data elements; and
an instruction decoder to decode program instructions to control the processing circuitry to perform the vector processing operations;
wherein in response to a replicate partition instruction specifying partition information defining positions of a plurality of variable size partitions within a result vector, each partition comprising at least one data element of the result vector and at least one partition comprising a plurality of adjacent data elements of the result vector, the instruction decoder is configured to control the processing circuitry to generate the result vector in which each partition having more than one data element comprises data values of a sequence of data elements of a source vector starting or ending at a selected data element position or an incrementing sequence of element indices starting or ending with the element index indicating said selected data element position.

(2) The apparatus according to clause (1), wherein the partition information comprises partition mask information comprising at least one marker bit identifying the start or end of a partition within the result vector.

(3) The apparatus according to clause (1), wherein the partition information comprises partition size information indicative of a number of data elements per partition.

(4) The apparatus according to clause (3), wherein the encoding of the replicate partition instruction constrains all partitions other than a first or last partition to have the same number of data elements.

(5) The apparatus according to any preceding clause, wherein the selected data element position is the same for each of the partitions.

(6) The apparatus according to any preceding clause, wherein the replicate partition instruction specifies information identifying different data element positions as the selected data element position for different partitions.

(7) The apparatus according to any preceding clause, wherein the replicate partition instruction specifies element selection information indicative of which data element position is said selected data element position.

(8) The apparatus according to any preceding clause, wherein in response to the replicate partition instruction, the instruction decoder is configured to control the processing circuitry to generate the result vector in which, for any of said plurality of partitions comprising a single data element, said single data element comprises a data value at said selected data element position within the source vector or an element index indicating said selected data element position.

(9) The apparatus according to any preceding clause, wherein the replicate partition instruction specifies active portion information defining an active portion of the result vector comprising said plurality of partitions;
wherein in response to the replicate elements instruction the instruction decoder is configured to control the processing circuitry to generate the result vector in which at least one data element outside the active portion has a predetermined value or a value of a corresponding data element of a destination register for storing the result vector.

(10) The apparatus according to clause (9), wherein the replicate partition instruction specifies a single control value identifying both the partition information and the active portion information.

(11) The apparatus according to any preceding clause, wherein in response to a source-transforming form of the replicate partition instruction specifying a source register storing the source vector, the instruction decoder is configured to control the processing circuitry to generate the result vector in which each partition having more than one data element comprises said data values of the sequence of data elements of the source vector starting or ending at a selected data element position.

(12) The apparatus according to any preceding clause, wherein in response to a load-replicate form of the replicate partition instruction, the instruction decoder is configured to control the processing circuitry to load at least part of the source vector from a data store and to generate the result vector in which each partition having more than one data element comprises said data values of the sequence of data elements of the source vector starting or ending at a selected data element position.

(13) The apparatus according to any preceding clause, wherein in response to an index-generating form of the replicate partition instruction, the instruction decoder is configured to control the processing circuitry to generate the result vector in which each partition having more than one data element comprises said incrementing sequence of element indices.

(14) A data processing method for an apparatus comprising processing circuitry to perform vector processing operations on vectors comprising a plurality of data elements; the method comprising:
  decoding a replicate partition instruction specifying partition information defining positions of a plurality of variable size partitions within a result vector, each partition comprising at least one data element of the result vector and at least one partition comprising a plurality of data elements of the result vector; and
  in response to the replicate partition instruction, controlling the processing circuitry to generate the result vector in which each partition having more than one data element comprises data values of a sequence of data elements of a source vector starting or ending at a selected data element position or an incrementing sequence of element indices starting or ending with the element index indicating said selected data element position.

(15) A computer-readable storage medium storing a virtual machine program for controlling a computer to provide an instruction execution environment corresponding to the apparatus of any of clauses (1) to (13).

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
  processing circuitry to perform vector processing operations on vectors comprising a plurality of data elements; and
  an instruction decoder to decode program instructions to control the processing circuitry to perform the vector processing operations;
  wherein in response to a replicate elements instruction specifying segment information defining positions of a first plurality of segments with a variable number of data elements within a result vector and defining positions of a second plurality of segments with a variable number of data elements within a source vector, each segment of the first plurality of segments comprising at least one data element of the result vector and at least one segment comprising a plurality of adjacent elements of the result vector, the instruction decoder is configured to control the processing circuitry to generate the result vector in which, in each respective segment, the encoding of the replicate elements instruction constrains the processing circuitry to repeat a repeating value throughout that segment of the result vector, the repeating value comprising a value corresponding to a selected vector data element position of a corresponding segment of the second plurality of segments of the source vector, and the encoding of the replicate elements instruction permits the repeating value to be different for different segments, and the replicate elements instruction specifies at least one operand indicating the segment information, the at least one operand having an encoding permitting a given segment comprising a plurality of data elements to comprise a number of data elements other than a power of two;
  wherein the segment information is separate from element selection information, specified by the replicate elements instruction, indicative of the selected vector data element position for each segment; and
  wherein an encoding of the segment information and the element selection information permits the selected vector data element position of the corresponding segment of the second plurality of segments of the source vector to be an intermediate vector data element position other than a lowest order and a highest order vector data element position of the corresponding segment of the second plurality of segments of the source vector.

2. The apparatus according to claim 1, wherein the segment information comprises segment mask information comprising at least one marker bit identifying the start or end of a segment within the result vector.

3. The apparatus according to claim 1, wherein the segment information comprises segment size information indicative of a number of data elements per segment.

4. The apparatus according to claim 3, wherein the encoding of the replicate elements instruction constrains all segments of the result vector other than a first or last segment to have the same number of data elements.

5. The apparatus according to claim 1, wherein the element selection information has an encoding which constrains, for each segment of the result vector, the selected vector data element position to be at the same relative position within the corresponding segment of the source vector.

6. The apparatus according to claim 1, wherein the element selection information has an encoding which identifies the selected vector data element position separately for each of the first plurality of segments.

7. The apparatus according to claim 1, wherein the replicate elements instruction specifies active portion information indicative of an active portion of the result vector comprising the first plurality of segments;
wherein in response to the replicate elements instruction, the instruction decoder is configured to control the processing circuitry to generate the result vector in which at least one data element outside the active portion has a predetermined value or a value of a corresponding data element of a destination register for storing the result vector.

8. The apparatus according to claim 1, wherein in response to a source-transforming form of the replicate elements instruction specifying a source register storing the source vector, the instruction decoder is configured to control the processing circuitry to generate the result vector in which, in each respective segment, the repeating value comprises a data value at the selected vector data element position of the corresponding segment of the source vector.

9. The apparatus according to claim 1, wherein in response to a load-replicate form of the replicate elements instruction, the instruction decoder is configured to control the processing circuitry to load at least part of the source vector from a data store and to generate the result vector in which, in each respective segment, the repeating value comprises a data value at the selected vector data element position of the corresponding segment of the source vector.

10. The apparatus according to claim 1, wherein in response to an index-generating form of the replicate elements instruction, the instruction decoder is configured to control the processing circuitry to generate the result vector in which, in each respective segment, the repeating value comprises an element index indicating the selected vector data element position for said respective segment.

11. The apparatus according to claim 1, wherein the value corresponding to the selected vector data element position of the corresponding segment comprises a data value at the selected vector data element position of the corresponding segment of the source vector.

12. The apparatus according to claim 1, wherein the value corresponding to the selected vector data element position of the corresponding segment comprises an element index indicating said selected vector data element position of the corresponding segment.

13. The apparatus according to claim 1, wherein the source vector is specified as an operand of the replicate elements instruction.

14. The apparatus according to claim 1, wherein in response to a subsequent instruction, the result vector is used to control mapping of data elements from the source vector to a further result vector.

15. A data processing method for an apparatus comprising processing circuitry to perform vector processing operations on vectors comprising a plurality of data elements, the method comprising:
decoding a replicate elements instruction specifying segment information defining positions of a first plurality of segments with a variable number of data elements within a result vector and defining positions of a second plurality of segments with a variable number of data elements within a source vector, each segment of the first plurality of segments comprising at least one data element of the result vector and at least one segment comprising a plurality of adjacent elements of the result vector; and
in response to the replicate elements instruction, generating the result vector in which, in each respective segment, the encoding of the replicate elements instruction constrains the processing circuitry to repeat a repeating value throughout that segment of the result vector, the repeating value comprising a value corresponding to a selected vector data element position of a corresponding segment of the second plurality of segments of the source vector, and the encoding of the replicate elements instruction permits the repeating value to be different for different segments, and the replicate elements instruction specifies at least one operand indicating the segment information, the at least one operand having an encoding permitting a given segment comprising a plurality of data elements to comprise a number of data elements other than a power of two;
wherein the segment information is separate from element selection information, specified by the replicate elements instruction, indicative of the selected vector data element position for each segment; and
wherein an encoding of the segment information and the element selection information permits the selected vector data element position of the corresponding segment of the second plurality of segments of the source vector to be an intermediate vector data element position other than a lowest order and a highest order vector data element position of the corresponding segment of the second plurality of segments of the source vector.

16. A non-transitory computer-readable storage medium storing a virtual machine program for controlling a computer to provide an instruction execution environment corresponding to the apparatus of claim 1.

* * * * *